United States Patent
Matsumoto et al.

(10) Patent No.: US 7,698,032 B2
(45) Date of Patent: Apr. 13, 2010

(54) AUTOMOTIVE LANE DEVIATION PREVENTION APPARATUS

(75) Inventors: Shinji Matsumoto, Kanagawa (JP); Satoshi Tange, Kanagawa (JP); Masayasu Shimakage, Yokohama (JP); Hiroyuki Yoshizawa, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1179 days.

(21) Appl. No.: 11/001,185

(22) Filed: Dec. 2, 2004

(65) Prior Publication Data
US 2005/0125153 A1   Jun. 9, 2005

(30) Foreign Application Priority Data
Dec. 3, 2003   (JP)   ............... 2003-404632

(51) Int. Cl.
G06G 5/00 (2006.01)
(52) U.S. Cl. ............... 701/36; 701/1; 701/41; 701/45; 701/70; 701/78; 701/79; 701/80; 701/96; 701/213; 701/301; 342/165; 180/403; 180/170; 180/282; 340/438
(58) Field of Classification Search .......... 701/1, 701/45, 213, 36, 41, 70, 78–80, 96, 301; 340/438; 180/403, 170, 282; 342/165
See application file for complete search history.

(56) References Cited

U.S. PATENT DOCUMENTS

| 4,361,202 A * | 11/1982 | Minovitch ............... 180/168 |
| 5,719,565 A | 2/1998 | Tsuno et al. |
| 5,765,116 A * | 6/1998 | Wilson-Jones et al. ........ 701/41 |
| 5,982,278 A * | 11/1999 | Cuvelier ................... 340/436 |
| 6,014,595 A * | 1/2000 | Kobayashi ................... 701/1 |
| 6,226,592 B1 * | 5/2001 | Luckscheiter et al. ....... 701/301 |
| 6,488,109 B1 * | 12/2002 | Igaki et al. ............... 180/169 |
| 7,219,031 B2 | 5/2007 | Kawazoe et al. |
| 2002/0002435 A1 | 1/2002 | Ohtsu |
| 2002/0041229 A1 | 4/2002 | Satoh et al. |
| 2003/0097206 A1 * | 5/2003 | Matsumoto et al. ............ 701/1 |
| 2004/0215393 A1 | 10/2004 | Matsumoto et al. |
| 2006/0224293 A1 | 10/2006 | Kawazoe et al. |

FOREIGN PATENT DOCUMENTS

JP   3-243453 A   10/1991

(Continued)

OTHER PUBLICATIONS

U.S. Appl. No. 11/001,156, filed Dec. 2, 2001, Matsumoto et al.

(Continued)

*Primary Examiner*—Khoi Tran
*Assistant Examiner*—Nikhil Sriraman
(74) *Attorney, Agent, or Firm*—Foley & Lardner LLP

(57) ABSTRACT

An automotive lane deviation prevention (LDP) apparatus includes a control unit detecting whether a host vehicle is in a specific state where the host vehicle is traveling on road-surface irregularities formed on or close to a lane marking line. The control unit actively decelerates the host vehicle when the host vehicle is in the specific state where the host vehicle is traveling on the road-surface irregularities.

21 Claims, 12 Drawing Sheets

FOREIGN PATENT DOCUMENTS

| | | |
|---|---|---|
| JP | 7-160993 A | 6/1995 |
| JP | 9-20223 A | 1/1997 |
| JP | 10-49672 A | 2/1998 |
| JP | 11-180327 A | 7/1999 |
| JP | 11-296660 A | 10/1999 |
| JP | 2000-59764 A | 2/2000 |
| JP | 2000-251171 A | 9/2000 |
| JP | 2001-310719 A | 11/2001 |
| JP | 2001-341599 A | 12/2001 |
| JP | 2002-362395 A | 12/2002 |
| JP | 2003-63280 A | 3/2003 |
| JP | 2003-112540 A | 4/2003 |
| JP | 2003-312506 A | 11/2003 |

OTHER PUBLICATIONS

U.S. Appl. No. 10/982,878, filed Nov. 8, 2004, Shimakage et al.

U.S. Appl. No. 10/994,319, filed Nov. 23, 2004, Tange et al.

* cited by examiner

RUMBLE STRIP LOCATED ON
WHITE LANE MARKING

RUMBLE STRIP LOCATED OUTSIDE
OF WHITE LANE MARKING

RIDGED PORTION FORMED ON WHITE LANE MARKING

AUTOMOTIVE LANE DEVIATION PREVENTION APPARATUS

TECHNICAL FIELD

The present invention relates to an automotive lane deviation prevention apparatus, and specifically to the improvement of an automatic lane deviation prevention control technology capable of preventing a host vehicle from deviating from its driving lane even when the host vehicle tends to deviate from the driving lane under a condition where there is poor visibility owing to extreme weather situations such as a thick fog, strong snowfall, extreme rain or icing of the host vehicle, or even when white lane markers or white lane markings are partly covered by snow, or under a condition where a white lane marker is out of an image pick-up enabling area of a vehicle-mounted charge-coupled device (CCD) camera and thus a lane-deviation tendency cannot be satisfactorily detected from the picture image data captured by the vehicle-mounted camera.

BACKGROUND ART

In recent years, there have been proposed and developed various automatic lane deviation prevention (LDP) control technologies and vehicle dynamics control (VDC) technologies. An LDP control system often uses a steering actuator for lane deviation avoidance. In the steering-actuator equipped LDP control system, lane deviation is prevented by producing a yaw moment by way of steering-torque control whose controlled variable is determined depending on a host vehicle's lateral displacement or a host vehicle's lateral deviation from a central axis (a reference axis) of the current host vehicle's driving lane. One such steering-actuator equipped LDP control system has been disclosed in Japanese Patent Provisional Publication No. 11-180327 (hereinafter is referred to as JP11-180327).

LDP control systems as disclosed in JP11-180327 generally use a vehicle-mounted charge-coupled device (CCD) camera and a camera controller as an external recognizing sensor, which functions to detect a position of the host vehicle within the host vehicle's traffic lane and whose sensor signal is used for the lane deviation avoidance control or lane deviation prevention control. Within the camera controller, on the basis of an image-processing picture image data in front of the host vehicle and captured by the CCD camera, a white lane marking, such as a white line, is detected and thus the current host vehicle's traffic lane, exactly, the current position information of the host vehicle within the driving lane, in other words, information regarding whether the host vehicle tends to deviate from the driving lane, is detected.

SUMMARY OF THE INVENTION

However, in case of white-lane-marking detection based on the picture image data captured by the vehicle-mounted camera, it is difficult to precisely detect or determine the host vehicle's lane deviation tendency when there is reduced visibility due to extreme weather situations, for example, a thick fog, strong snowfall, extreme rain (extreme water spray), or icing of the host vehicle. That is, in the extreme weather situations, the LDP control system's ability to avoid the host vehicle's lane deviation is remarkably lowered. To avoid this, predetermined road-surface irregularities, often called "rumble strip", artificially formed on the white lane marking or equidistantly repeatedly formed outside of and close to the white lane marking, are utilized. The driver can be certainly informed or warned of the host vehicle's lane-deviation tendency by way of rumble noise and/or vibratory motion input into the host vehicle, even when it is difficult to precisely detect the host vehicle's lane deviation tendency when there is reduced visibility due to extreme weather situations.

However, under such a situation where the host vehicle is traveling on a rumble strip, there is an impending risk that the host vehicle is brought into collision-contact with an object such as another vehicle or the host vehicle runs out of the roadway. Thus, it would be desirable to provide an active safety system as well as warnings to the driver, in other words, a passive warning system, so as to greatly enhance safety, even when the host vehicle is traveling on the rumble strip in extreme weather situations.

Accordingly, it is an object of the invention to provide an automotive lane deviation prevention (LDP) apparatus, capable of greatly enhancing the safety of an LDP system equipped host vehicle by way of active and passive safety systems, even when a white lane marking cannot be satisfactorily recognized or captured by a vehicle-mounted camera (an external recognizing sensor) in extreme weather situations or owing to poor visibility or when a white lane marker is out of an image pick-up enabling area.

In order to accomplish the aforementioned and other objects of the present invention, an automotive lane deviation prevention (LDP) apparatus comprises a processor programmed to perform detecting whether a host vehicle is in a state where the host vehicle is traveling on road-surface irregularities formed on or close to a lane marking line, and actively decelerating the host vehicle when the host vehicle is in the state where the host vehicle is traveling on the road-surface irregularities.

According to another aspect of the invention, an automotive lane deviation prevention (LDP) apparatus comprises a road-surface irregularities detector that detects whether a host vehicle is in a state where the host vehicle is traveling on road-surface irregularities formed on or close to a lane marking line, an actuator capable of decelerating the host vehicle, and a control unit configured to be electronically connected to the road-surface irregularities detector and the actuator for LDP control purposes, the control unit comprising a vehicle deceleration control section that executes vehicle deceleration control to actively decelerate the host vehicle when the host vehicle is in the state where the host vehicle is traveling on the road-surface irregularities.

According to another aspect of the invention, an automotive lane deviation prevention (LDP) apparatus comprises road-surface irregularities detection means for detecting whether a host vehicle is in a state where the host vehicle is traveling on road-surface irregularities formed on or close to a lane marking line, an actuator capable of decelerating the host vehicle, and a control unit configured to be electronically connected to the road-surface irregularities detection means and the actuator for LDP control purposes, the control unit comprising vehicle deceleration control means for executing vehicle deceleration control to actively decelerate the host vehicle when the host vehicle is in the state where the host vehicle is traveling on the road-surface irregularities.

According to another aspect of the invention, a method of preventing lane deviation of a host vehicle employing braking force actuators that adjust braking forces applied to respective road wheels, the method comprising detecting whether a host vehicle is in a state where the host vehicle is traveling on road-surface irregularities formed on or close to a lane marking line, and executing vehicle deceleration control actively decelerating the host vehicle when the host vehicle is in the state where the host vehicle is traveling on the road-surface irregularities.

The other objects and features of this invention will become understood from the following description with reference to the accompanying drawings.

DESCRIPTION OF THE PREFERRED EMBODIMENTS

Figure 1:
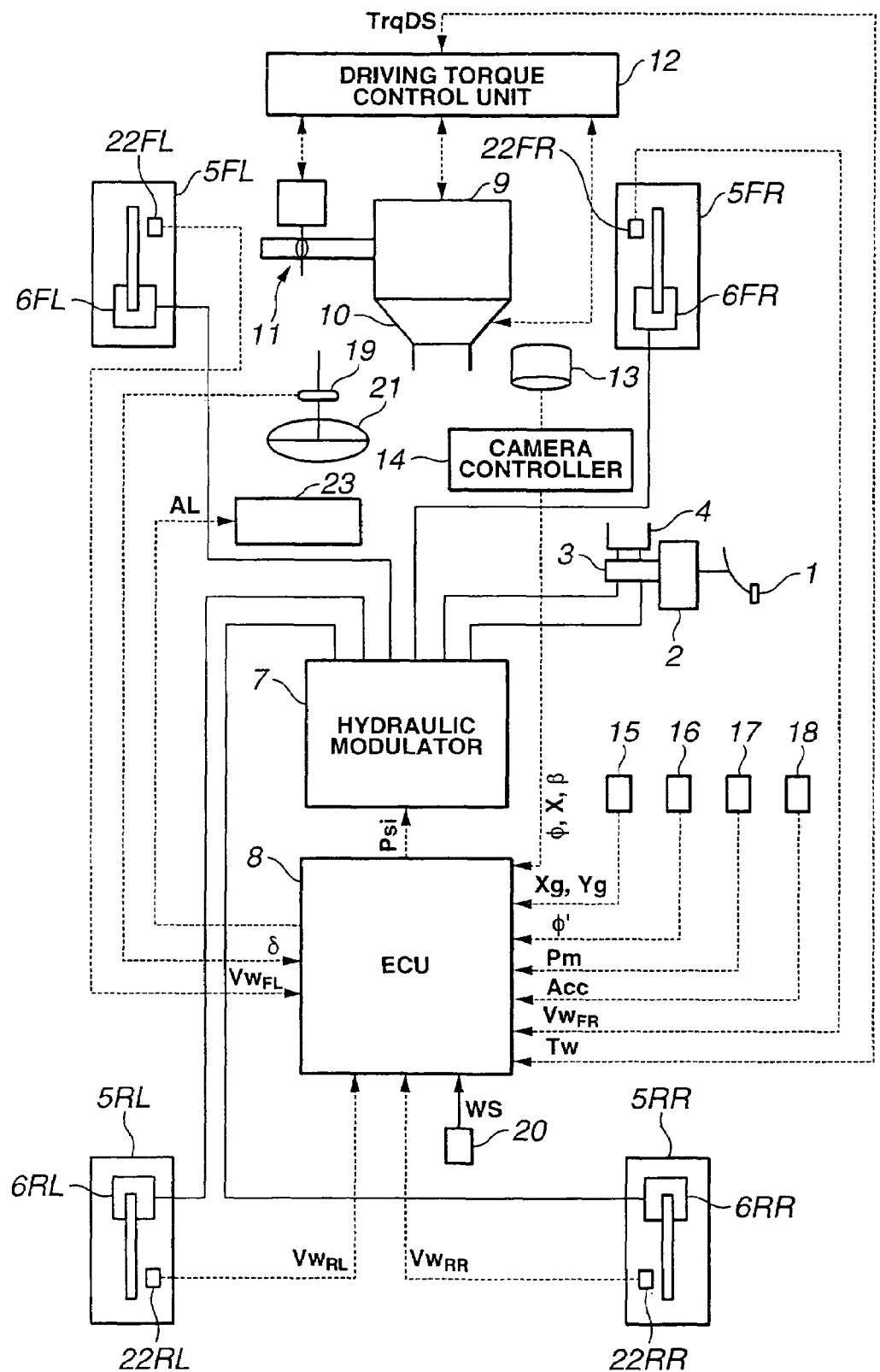
FIG. 1 is a system block diagram illustrating an embodiment of an automotive lane deviation prevention (LDP) apparatus.

Referring now to the drawings, particularly to FIG. 1, the lane deviation prevention (LDP) apparatus of the embodiment is exemplified in an adaptive cruise control (ACC) system equipped rear-wheel-drive vehicle employing an automatic transmission 10 and a rear differential. In the LDP apparatus of the embodiment shown in FIG. 1, as a braking force control system, which regulates hydraulic brake pressures of individual wheel-brake cylinders (i.e., front-left, front-right, rear-left, and rear-right wheel-brake cylinders) independently of each other, a four-channel braking control system such as a four-channel ABS system for anti-skid control or a four-channel traction control system for traction control is utilized. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Usually, a brake fluid pressure, risen by master cylinder 3 depending on the amount of depression of brake pedal 1, is supplied to each of a front-left wheel-brake cylinder 6FL for a front-left road wheel 5FL, a front-right wheel-brake cylinder 6FR for a front-right road wheel 5FR, a rear-left wheel-brake cylinder 6RL for a rear-left road wheel 5RL, and a rear-right wheel-brake cylinder 6RR for a rear-right road wheel 5RR. Front-left, front-right, rear-left, and rear-right wheel-brake cylinder pressures are regulated independently of each other by means of a brake fluid pressure control circuit (a wheel cylinder pressure control unit) or a hydraulic modulator 7, which is disposed between master cylinder 3 and each of wheel-brake cylinders 6FL, 6FR, 6RL, and 6RR. Hydraulic modulator 7 includes hydraulic pressure control actuators (braking force actuators) respectively associated with first-channel (front-left), second-channel (front-right), third-channel (rear-left), and fourth-channel (rear-right) brake circuits, such that front-left, front-right, rear-left, and rear-right wheel-brake cylinder pressures are built up, held, or reduced independently of each other. Each of the hydraulic pressure control actuators of hydraulic modulator 7 is comprised of a proportional solenoid valve such as an electromagnetically-controlled solenoid valve that regulates the wheel-brake cylinder pressure to a desired pressure level. Each of the electromagnetically-controlled solenoid valves of hydraulic modulator 7 is responsive to a command signal from a braking/driving force control unit, simply an electronic control unit (ECU) 8, for regulating the wheel-cylinder pressure of each of wheel-brake cylinders 6FL-6RR in response to the command signal from the output interface of ECU 8, regardless of the braking action (brake-pedal depression) manually created by the driver's foot.

The ACC system equipped rear-wheel-drive vehicle of the embodiment of FIG. 1 also includes an electronic driving torque control unit 12 that controls a driving torque transmitted to rear road wheels 5RL and 5RR serving as drive wheels, by controlling an operating condition of an engine 9, a selected transmission ratio of automatic transmission 10, and/or a throttle opening of a throttle valve 11 (correlated to an accelerator opening Acc). Concretely, the operating condition of engine 9 can be controlled by controlling the amount of fuel injected and/or an ignition timing. Also, the engine operating condition can be controlled by the throttle opening control. Driving torque control unit 12 is designed to individually control the driving torque transmitted to rear road wheels 5RL and 5RR (drive wheels). Additionally, driving torque control unit 12 is responsive to a driving-torque command signal from ECU 8 in a manner so as to control the driving torque depending on the driving-torque command signal value.

The ACC system equipped rear-wheel-drive vehicle of the embodiment of FIG. 1 also includes a stereocamera with a charge-coupled device (CCD) image sensor, simply, a monocular camera comprised of a charge-coupled device (CCD) camera (a picture image pick-up device) 13 and a camera controller (serving as a lane marking line detector) 14 as an external recognizing sensor (or a host vehicle's position information detector), which functions to detect the current position information of the ACC system equipped vehicle (the host vehicle) within the driving lane (the host vehicle's traffic lane) and whose sensor signal is used for detecting whether or not the host vehicle tends to deviate from the current driving lane. Within camera controller 14, on the basis of an image-processing picture image data in front of the host vehicle and captured by CCD camera 13, a lane marker or lane marking (or a white lane marking line by which two adjacent lanes are divided), such as a white line, is detected and thus the current host vehicle's traffic lane, exactly, the current position information of the host vehicle within the driving lane, is determined based on the white lane marker detected. The processor of camera controller 14 calculates and determines or estimates, based on the image data from CCD camera 13 indicative of the picture image, a host vehicle's yaw angle $\phi$ with respect to the sense of the current host vehicle's driving lane, a host vehicle's lateral displacement or a host vehicle's lateral deviation X from a central axis (a reference axis) of the current host vehicle's driving lane, and a curvature $\beta$ of the current host vehicle's driving lane. The host vehicle's yaw angle $\phi$ means an angle between the sense of the current host vehicle's driving lane and the host vehicle's x-axis of a vehicle axis system (x, y, z). When the white lane marker or lane marking, such as a white line, in front of the host vehicle, cannot be recognized or detected by CCD camera 13 owing to extreme weather situations such as a thick fog, strong snowfall, or extreme rain, camera controller 14 outputs or feeds a low-level recognition signal to ECU 8 to inform the ECU of the lane-marker unrecognizable state (Fcr=0) where the white lane marker in front of the host vehicle is not sufficiently satisfactorily detected. Conversely when the white lane marker can be recognized by CCD camera 13, camera controller 14 outputs or feeds a high-level recognition signal to ECU 8 to inform the ECU of the lane-marker recognizable state (Fcr=1). In more detail, Fcr=0 means a state where the lane marker exists outside of the image pick-up enabling area of CCD camera 13 and thus it is impossible to detect or recognize the lane marker from the picture image data captured by CCD camera 13. Fcr=1 means a state where the lane marker exists within the image pick-up enabling area of CCD camera 13 and thus it is possible to detect or recognize the lane marker from the picture image data captured by CCD camera 13. In the event that the white lane marker has not been properly recognized by CCD camera 13 due to extreme weather situations, that is, in case of Fcr=0, each of detection parameters, namely, the host vehicle's yaw angle $\phi$, lateral displacement X, and curvature $\beta$ of the host vehicle's driving lane is set to "0". Concretely, camera controller 14 is designed to detect the host vehicle's driving lane information, while utilizing a hypothetical driving lane detection area, which can be initialized and updated to detect a white lane marker, and then computes the host vehicle's driving state indicative data and traveling-path condition indicative data, such as yaw angle $\phi$, lateral displacement X, and curvature $\beta$, based on the detected driving lane. More concretely, a left-hand white lane marker and a right-had white lane marker, provided on both sides of the host vehicle's driving lane, are detected, and thereafter the host vehicle's driving lane information is estimated or determined, utilizing the detected left and right lane markers. Actually, from the viewpoint of reduced load on computation and shortened operating time, in detecting or scanning each of the left and right white lane markers, a small driving lane detection area, called "a window", partially extracted from the picture image (the road image) captured by CCD camera 13, is hypothetically set. A lane-marker detecting or scanning operation is made within the small driving lane detection area (the window). Generally, when the traveling direction of the host vehicle with respect to the central axis of the driving lane changes, the position of the lane marker on the road image also changes. Thus, the traveling direction of the host vehicle with respect to the central axis of the driving lane must be estimated. Actually, the traveling direction of the host vehicle with respect to the central axis of the driving lane is estimated based on a steer angle. On the basis of the estimated host vehicle's traveling direction, the previously-noted small driving lane detection area is suitably updated by a new window having a high possibility that the lane marker may be picture-imaged within the new window. After this, in order to highlight the boundary between the lane marker and the road surface of the road image, a specific filtering process is made. A certain point on the boundary line highlighted and filter-processed is selected or determined as a lane-marker candidate point. In this manner, during subsequent executions of picture-image processing, a plurality of lane-marker candidate points are determined, and set or plotted on the road image. The lane marker can be obtained or detected as the set of lane-marker candidate points continuously linking to each other. The method of detecting or estimating the white lane marker while utilizing the small driving lane detection area (the window), partially extracted from the picture image (the road image) captured by the CCD camera, is conventional and forms no part of the present invention. One such lane-marker detection method has been disclosed in Japanese Patent Provisional Publication No. 11-296660.

Electronic control unit (ECU) 8 generally comprises a microcomputer that includes a central processing unit (CPU) or a microprocessor (MPU), memories (RAM, ROM), and an input/output interface (I/O). In addition to the signals indicative of parameters $\phi$, X, and $\beta$ and the recognition signal calculated by camera controller 14, and the signal indicative of a driving torque Tw, controlled and produced by driving-torque control unit 12, the input/output interface (I/O) of ECU 8 receives input information from various engine/vehicle switches and sensors, such as an acceleration sensor (G sensor) 15, a yaw rate sensor 16, a master-cylinder pressure sensor 17, an accelerator opening sensor 18, a steer angle sensor 19, front-left, front-right, rear-left, and rear-right wheel speed sensors 22FL, 22FR, 22RL, and 22RR, and a direction indicator switch 20. As seen from the system block diagram of FIG. 1, for mutual communication via a data link, ECU 8 is electrically connected to driving torque control unit 12. Acceleration sensor 15 is provided to detect a longitudinal acceleration Xg and a lateral acceleration Yg, exerted on the host vehicle, and/or to detect a vertical acceleration of a point of the vehicle suspension, moving up and down. Yaw rate sensor 16 is provided to detect a yaw rate $\phi'$ (one of the host vehicle's driving states) resulting from a yaw moment acting on the host vehicle. Master-cylinder pressure sensor 17 is provided to detect a master-cylinder pressure Pm of master cylinder 3, that is, the amount of depression of brake pedal 1. Accelerator opening sensor 18 is provided to detect an accelerator opening Acc (correlated to a throttle opening), which is dependent on a manipulated variable of the driver's accelerator-pedal depression. Steer angle sensor 19 is provided to detect steer angle δ of a steering wheel 21. Front-left, front-right, rear-left, and rear-right wheel speed sensors 22FL, 22FR, 22RL, and 22RR are provided respectively to detect front-left, front-right, rear-left, and rear-right wheel speeds $Vw_{FL}$, $Vw_{FR}$, $Vw_{RL}$, and $Vw_{RR}$, which are collectively referred to as "Vwi". Direction indicator switch 20 is provided to detect whether a direction indicator is turned on and also to detect the direction indicated by the direction indicator, and to output a direction indicator switch signal WS. In addition to CCD camera 13 and camera controller 14, a radar controller using a radar sensor, such as a scanning laser radar sensor serving as an object detector, may be provided to more precisely capture, recognize, sense, or detect a preceding vehicle (or a relevant target vehicle), or a frontally located object, or a running vehicle on the adjacent lane. Within the ACC system, these input informational data are used for collision avoidance control as well as lane deviation prevention (LDP) control, containing both of yaw moment control and vehicle deceleration control (described later). In the presence of a directionality or polarity concerning left or right directions of each of the vehicle driving state indicative data and the traveling-path condition indicative data, namely, yaw rate $\phi'$, lateral acceleration Yg, steer angle δ, yaw angle $\phi$, and lateral displacement X, a change in the vehicle driving state indicative data to the left is indicated as a positive value, while a change in the vehicle driving state indicative data to the right is indicated as a negative value. More concretely, during a left turn, yaw rate $\phi'$, lateral acceleration Yg, steer angle δ, and yaw angle $\phi$ are all indicated as positive values. Conversely during a right turn, these parameters $\phi'$, Yg, δ, and $\phi$ are all indicated as negative values. On the other hand, lateral displacement X is indicated as a positive value when the host vehicle is deviated from the central axis of the current driving lane to the left. Conversely when the host vehicle is deviated from the central axis of the current driving lane to the right, lateral displacement X is indicated as a negative value. The positive signal value of direction indicator switch signal WS from direction indicator switch 20 means a left turn (counterclockwise rotation of direction indicator switch 20), whereas the negative signal value of direction indicator switch signal WS means a right turn (clockwise rotation of direction indicator switch 20). ECU 8 is also connected to a warning system 23 having a warning buzzer and/or a warning light, which comes on in response to an alarm signal AL from ECU 8, so that a visual and/or audible warning is signaled to the driver. Within ECU 8, the central processing unit (CPU) allows the access by the I/O interface of input informational data signals from the previously-discussed engine/vehicle switches and sensors and camera controller 14 and driving torque control unit 12, and is responsible for carrying various control programs stored in the memories and capable of performing necessary arithmetic and logic operations (described later in reference to FIG. 2, 15 or 17). Computational results or arithmetic calculation results, in other words, calculated output signals or control command signals are relayed via the output interface circuitry to the output stages, for example, the solenoids of hydraulic modulator 7 and the warning buzzer/warning light of warning system 23.

Figure 2:
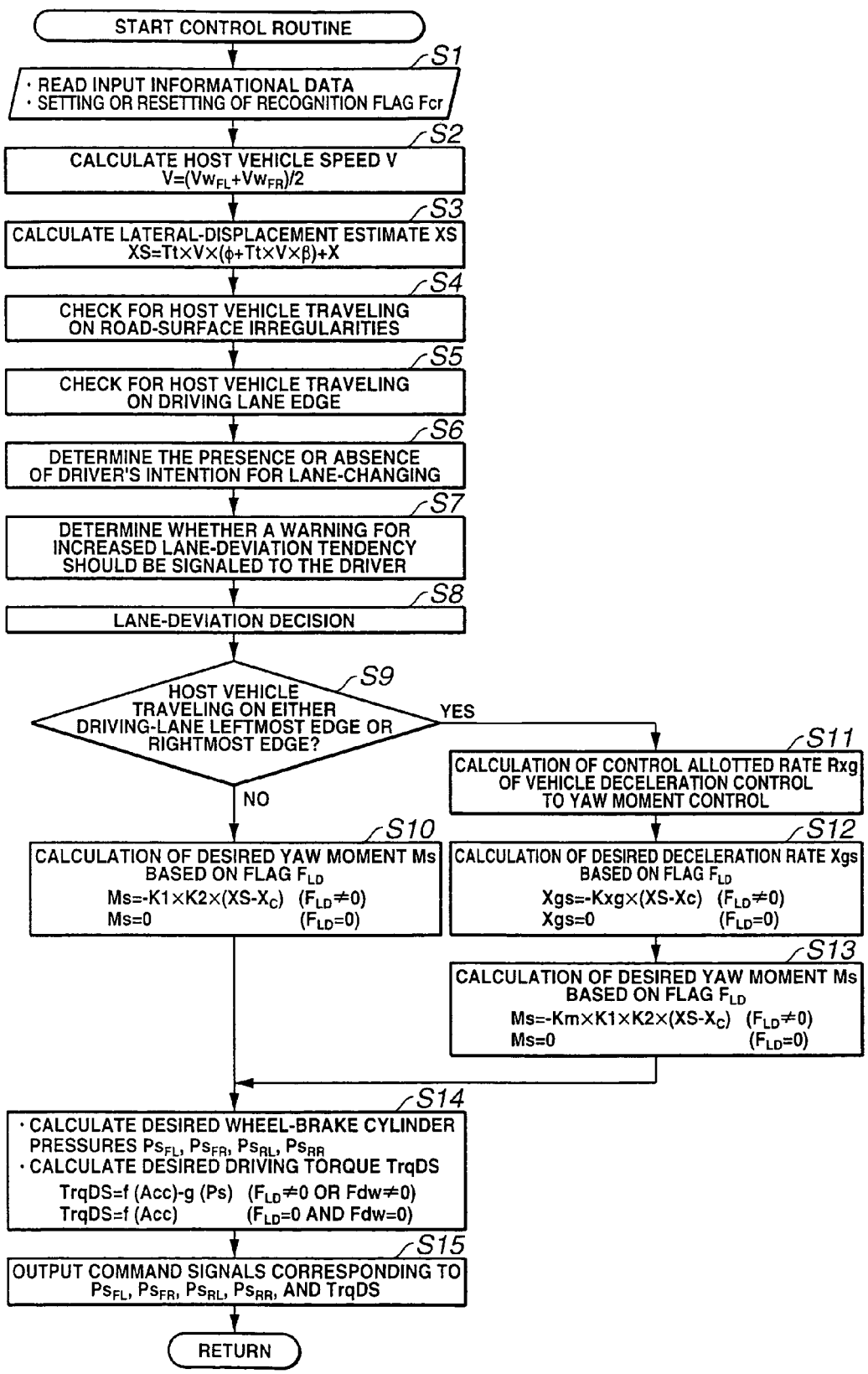
FIG. 2 is a flow chart showing a lane deviation prevention control routine executed by the LDP apparatus of the embodiment of FIG. 1.

The LDP control routine executed by ECU 8 incorporated in the automotive LDP apparatus of the embodiment shown in FIG. 1 is hereunder described in detail in reference to the flow chart shown in FIG. 2. The LDP control routine of FIG. 2 is executed as time-triggered interrupt routines to be triggered every predetermined sampling time intervals ΔT such as 20 milliseconds.

At step S1, input informational data from the previously-noted engine/vehicle switches and sensors, and driving-torque controller 12 and camera controller 14 are read. Concretely, read are engine/vehicle switch/sensor signal data, such as the host vehicle's longitudinal acceleration Xg, lateral acceleration Yg, yaw rate $\phi'$, wheel speeds Vwi ($Vw_{FL}$, $Vw_{FR}$, $Vw_{RL}$, $Vw_{RR}$), accelerator opening Acc, master-cylinder pressure Pm, steer angle δ, and direction indicator switch signal WS, and signal data from driving-torque control unit 12 such as driving torque Tw, and signal data from camera controller 14 such as the host vehicle's yaw angle $\phi$ with respect to the direction of the current host vehicle's driving lane, lateral displacement X from the central axis of the current host vehicle's driving lane, curvature β of the current driving lane, and the recognition signal regarding whether or not the white lane marker is detected by camera controller 14. The host vehicle's yaw angle $\phi$ may be calculated by integrating yaw rate $\phi'$ detected by yaw rate sensor 16. Additionally, at step S1, a check is made to determine whether or not the recognition signal from camera controller 14 indicates a state where the white lane marking line in front of the host vehicle is sufficiently satisfactorily detected. When the recognition signal from camera controller 14 indicates a state where the white lane marking line in front of the host vehicle is detected, a so-called recognition flag Fcr is set to "1". Conversely when the recognition signal from camera controller 14 indicates a state where the white lane marking line in front of the host vehicle is not detected, recognition flag Fcr is reset to "0". As previously described, Fcr=0 means the lane-marker unrecognizable state (or the lane-marker non-detecting state), whereas Fcr=1 means the lane-marker recognizable state (or the lane-marker detecting state). When recognition flag Fcr extracted through step S1 is set (Fcr=1), detection parameters, namely, the host vehicle's yaw angle $\phi$, lateral displacement X, and curvature β of the host vehicle's driving lane are stored as the latest up-to-date informational data in predetermined memory addresses of the RAM of ECU 8. Conversely when recognition flag Fcr extracted through step S1 is reset (Fcr=0), detection parameters, namely, the host vehicle's yaw angle $\phi$, lateral displacement X, and curvature β of the host vehicle's driving lane are set to "0".

At step S2, a host vehicle's speed V is calculated. Concretely, host vehicle speed V is calculated as a simple average value $(Vw_{FL}+Vw_{FR})/2$ of front-left and front-right wheel speeds $Vw_{FL}$ and $Vw_{FR}$ (corresponding to wheel speeds of driven road wheels 5FL and 5FR), from the expression $V=(Vw_{FL}+Vw_{FR})/2$. In lieu thereof, in case of an ABS system equipped vehicle, a pseudo vehicle speed used for skid control may be used as host vehicle speed V.

At step S3, a lateral-displacement estimate XS, in other words, an estimate of a future lateral deviation or an estimate of a future lateral displacement, is estimated or arithmetically calculated. Actually, lateral-displacement estimate XS is estimated or arithmetically calculated based on the latest up-to-date information concerning the host vehicle's yaw angle $\phi$ with respect to the direction of the current host vehicle's driving lane (in other words, the orientation of the host vehicle with respect to the direction of the current host vehicle's driving lane), lateral displacement X from the central axis of the current host vehicle's driving lane, curvature β of the current host vehicle's driving lane, and the host vehicle's speed V (=(Vw$_{FL}$+Vw$_{FR}$)/2), from the following expression (1)

$$XS = Tt \times V \times (\phi + Tt \times V \times \beta) + x \quad (1)$$

where Tt denotes a headway time between the host vehicle and the preceding vehicle both driving in the same sense and in the same lane, and the product (Tt×V) of the headway time Tt and the host vehicle's speed V means a distance between the current position of the host vehicle and the forward point-of-fixation. That is, an estimate of lateral deviation from the central axis of the current host vehicle's driving lane, which may occur after the headway time Tt, is regarded as a future lateral-displacement estimate XS. In the LDP apparatus of the embodiment, as hereinafter described in detail, when the absolute value |XS| of lateral-displacement estimate XS becomes greater than or equal to a predetermined lateral-displacement criterion X$_C$ (described later), the processor of ECU 8 determines that there is an increased tendency for the host vehicle to deviate from the current driving lane. At the same time, at step S3, a check for the lane-marker detecting state or the lane-marker non-detecting state is made based on the state of recognition flag Fcr, calculated at the current execution cycle. When recognition flag Fcr, calculated at the current execution cycle, is reset (Fcr=0), lateral-displacement estimate XS is set to "0".

Figure 3A:
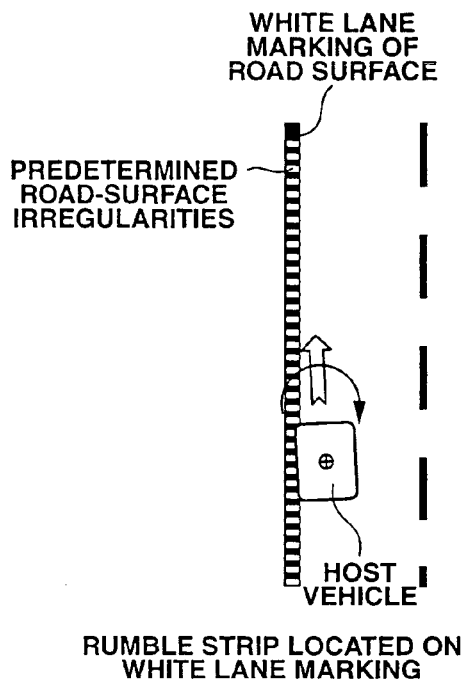
FIGS. 3A-3B are explanatory views respectively showing a rumble strip formed on the white lane marking and a rumble strip formed outside of and close to the white lane marking.
Figure 3B:
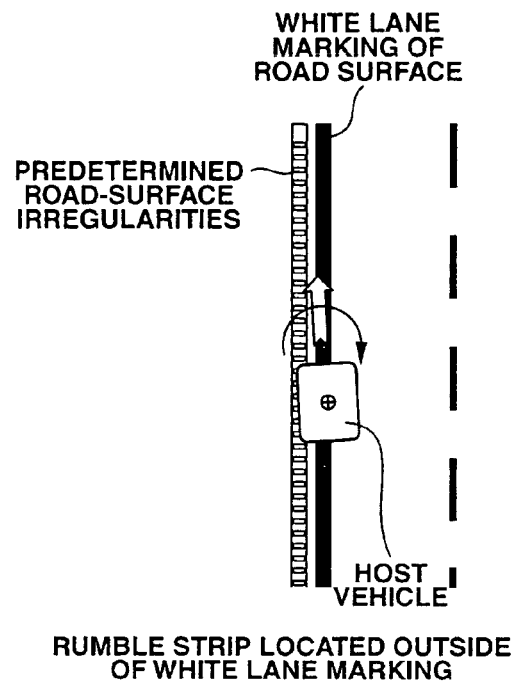
Figure 4A:
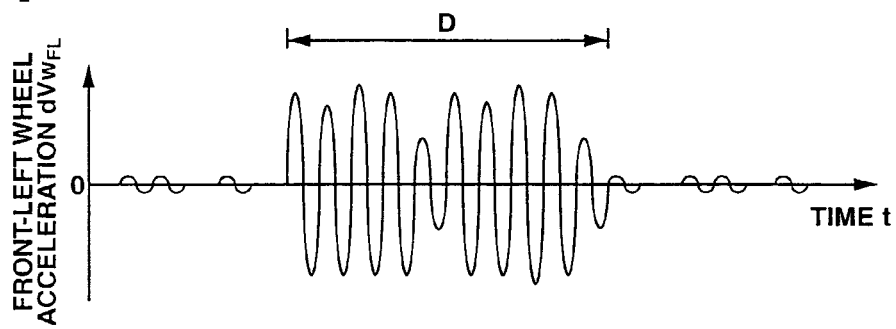
FIGS. 4A-4B are time charts respectively showing variations in front-left wheel acceleration/deceleration and variations in front-right wheel acceleration/deceleration.
Figure 4B:
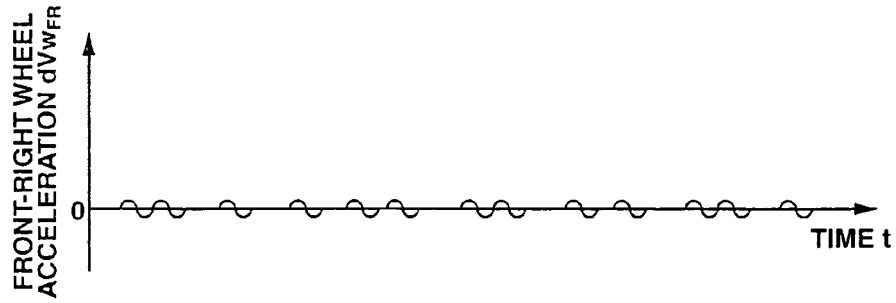
Figure 5A:
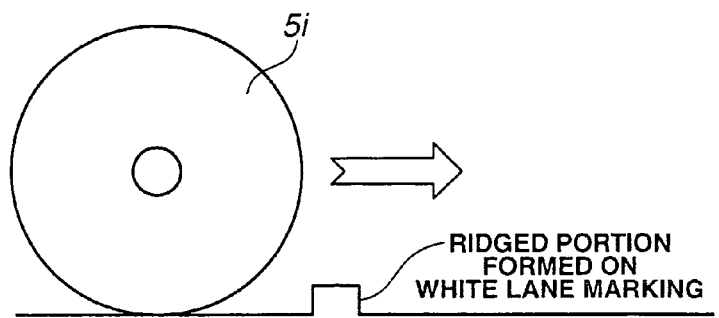
FIGS. 5A-5C are explanatory views showing wheel speed fluctuations and wheel acceleration fluctuations, occurring due to irregularities of the road surface.
Figure 5B:
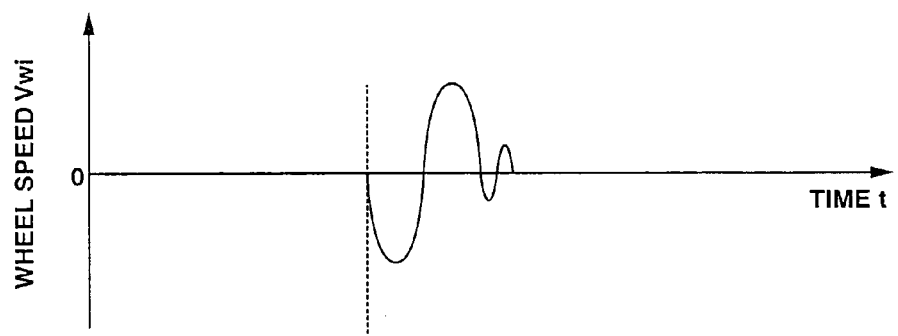
Figure 5C:
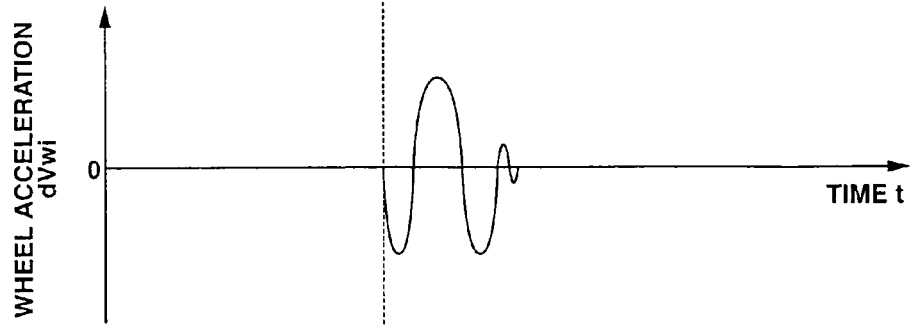

At step S4, a detection for predetermined road-surface irregularities, often called "rumble strip", which are artificially formed on the white lane marking line or the white lane marker (see FIG. 3A) or equidistantly repeatedly formed outside of and close to the white lane marker (see FIG. 3B), is made. In other words, a check is made to determine whether or not either one of road wheels of the host vehicle is traveling on predetermined road-surface irregularities (the rumble strip). For instance, in order to warn or inform the driver of the lane-deviation tendency of the vehicle from the current driving lane, by way of rumble noise and/or vibratory motion input into the vehicle, such predetermined artificial road-surface irregularities are generally equidistantly repeatedly formed on the white lane marker or equidistantly repeatedly formed outside of and close to the white lane marker. As can be seen from the explanatory views of FIGS. 4A-4B and 5A-5C, for instance, when the road wheel of the host vehicle is traveling on the predetermined road-surface irregularities (the rumble strip), the wheel speed Vwi tends to fluctuate at a substantially constant period or at a substantially constant oscillation frequency, since the predetermined artificial road-surface irregularities (the rumble strip) are equidistantly repeatedly formed on the road surface. With wheel speed Vwi fluctuating or oscillating at the substantially constant period, as shown in the time period D of the time charts of FIGS. 4A-4B, a wheel acceleration/deceleration (simply, wheel acceleration) dVwi also tends to fluctuate at a substantially constant period or at a substantially constant oscillation frequency. FIGS. 4A and 4B respectively show fluctuations in front-left wheel acceleration dVw$_{FL}$ and fluctuations in front-right wheel acceleration dVw$_{FR}$ under a specific condition where the host vehicle begins to deviate from the current driving lane and the front-left road wheel begins to travel on the predetermined artificial road-surface irregularities (the rumble strip). In FIGS. 4A-4B, the axis of ordinate indicates wheel acceleration dVwi, whereas the axis of abscissa indicates the elapsed time t. The degree of wheel speed fluctuations or the degree of wheel acceleration fluctuations, monitored by each wheel speed sensor 22i, can be properly varied or tuned depending on the pitch of the predetermined artificial road-surface irregularities (the rumble strip), the resolving power of the wheel speed sensor (the number of pulses generated per one revolution of the road wheel, in other words, the number of teeth of a toothed disc in a pulse-generator-type wheel speed sensor), tire and suspension characteristics, and the like. For instance, suppose that the pitch of the predetermined artificial road-surface irregularities (the rumble strip) or the distance between two adjacent ridged portions of the predetermined artificial road-surface irregularities is adequately large or wide, and also the resolving power of wheel speed sensor 22i is adequately high. In such a case, when road wheel 5i passes through the predetermined artificial road-surface irregularities (see FIG. 5A), wheel speed Vwi tends to fluctuate for every irregularities, that is, for every uneven portions (see FIG. 5B). As a result of this, wheel acceleration dVwi also fluctuates (see FIG. 5C). In FIG. 5A, the predetermined artificial road-surface irregularities are comprised of ridged portions equidistantly repeatedly formed on the road surface. In lieu thereof, the predetermined artificial road-surface irregularities may be comprised of recessed portions equidistantly repeatedly formed on the road surface. As a matter of course, when the road wheel of the host vehicle passes through the predetermined artificial road-surface irregularities comprised of the recessed portions in place of the ridged portions, wheel speed Vwi tends to fluctuate for every recessed portions. In the example of input vibrations shown in FIGS. 5A-5C, although tire and suspension characteristics are not taken into account, the frequency of input vibrations, transmitted from the road surface (the rumble strip comprised of the ridged or recessed portions) to the road wheel, tends to become high during high-speed traveling on the rumble strip whose irregularities have a relatively narrow pitch. This is because the period of fluctuations of wheel acceleration dVwi and the amplitude of fluctuations of wheel acceleration dVwi, in other words, the period of fluctuations of wheel speed Vwi and the amplitude of fluctuations of wheel speed Vwi, both vary depending on the tire and suspension characteristics as well as host vehicle speed V. Thus, when road wheel 5i the host vehicle is traveling on the ridged portions (or the recessed portions) at a comparatively high vehicle speed, remarkable fluctuations of wheel speed Vwi or remarkable fluctuations of wheel acceleration dVwi do not occur for every ridged portions (or for every recessed portions). That is, during high-speed traveling on the predetermined road-surface irregularities (the rumble strip), the host vehicle is greatly affected by the tire and suspension characteristics, and thus the period of fluctuations of wheel speed Vwi tends to increase, whereas the amplitude of fluctuations of wheel speed Vwi tends to decrease. Conversely when road wheel 5i is traveling on the predetermined road-surface irregularities (the rumble strip) at a comparatively low vehicle speed, remarkable fluctuations of wheel speed Vwi or remarkable fluctuations of wheel acceleration dVwi occur for every ridge portions (or for every recessed portions). For the sake of simplicity, the presence of wheel speed fluctuations for only one of steered road wheels, namely front-left and front-right road wheels 5FL and 5FR, is hereinafter explained, because the arithmetic operations of step S4 are the same in the host vehicle's lane deviations to the left or to the right. As appreciated from the above, it is possible to detect or determine whether the host vehicle is traveling on the predetermined irregularities artificially formed on the road surface, by detecting the presence or absence of periodical wheel-speed fluctuation or periodical wheel-acceleration fluctuation. Concretely, in order to detect the presence or absence of periodical wheel-speed fluctuation and thus to determine whether the host vehicle is traveling on the predetermined artificial road-surface irregularities, the following specific checks are made. First of all, a wheel acceleration/deceleration (simply, a wheel acceleration) dVwi is arithmetically calculated based on the latest up-to-date information concerning wheel speed Vwi read through step S1 from the following expression (2).

$$dVwi = Kg \times (Vwi_{(k-1)} - Vwi_{(k)})/\Delta T \quad (2)$$

where $Vwi_{(k)}$ denotes the current value of wheel speed Vwi, $Vwi_{(k-1)}$ denotes the previous value of wheel speed Vwi, calculated one cycle before (i.e., 20 milliseconds before), Kg denotes a unit conversion factor, and $\Delta T$ denotes a predetermined sampling time interval such as 20 milliseconds.

Figure 6:
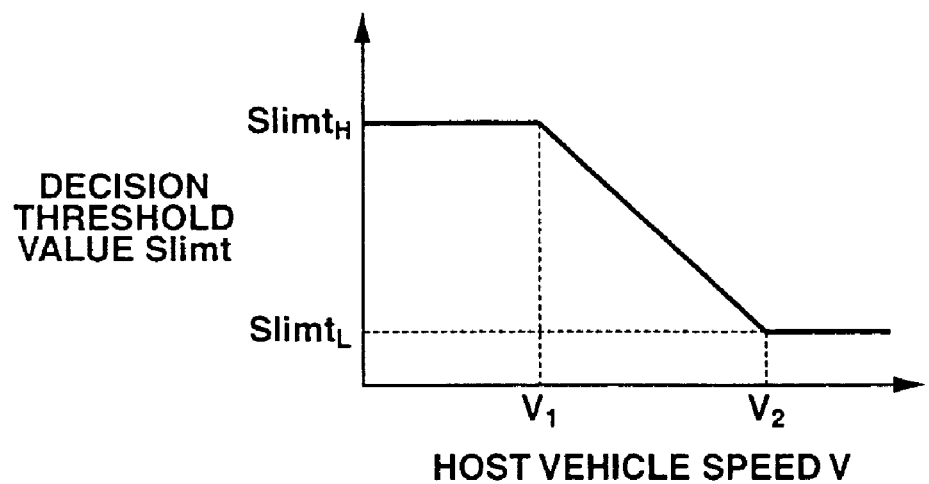
FIG. 6 is a predetermined host vehicle speed V versus decision threshold value $S_{limt}$ characteristic map used for the LDP control routine (arithmetic and logic operations) of FIG. 2.
Figure 7:
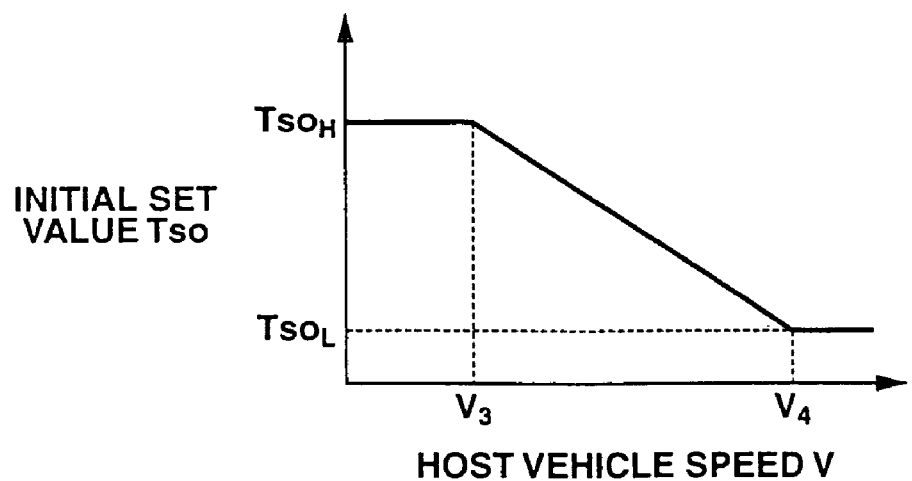
FIG. 7 is a predetermined host vehicle speed V versus initial set value $T_{SO}$ characteristic map used for the LDP control routine of FIG. 2.

At the same time, at step S4, a check is made to determine whether the calculated wheel acceleration $dVwi_{(k)}$ becomes greater than a decision threshold value $S_{limt}$. When the calculated wheel acceleration $dVwi_{(k)}$ becomes greater than decision threshold value $S_{limt}$, that is, when switching from the state defined by $dVwi_{(k)} \leq S_{limt}$ to the state defined by $dVwi_{(k)} > S_{limt}$ occurs, a further check is made to determine whether a predetermined time interval has expired from a time when wheel speed Vwi has been fluctuating one cycle before and thus the condition $dVwi_{(k-1)} > S_{limt}$ has been satisfied. Actually, in the presence of switching from $dVwi_{(k)} \leq S_{limt}$ to $dVwi_{(k)} > S_{limt}$, as the further check, a count value Tsi of a count-down timer is compared to a predetermined threshold value TsL. At this time, if the count value Tsi of the count-down timer is less than or equal to predetermined threshold value TsL, that is, $0 < Tsi \leq TsL$, the count value Tsi of the count-down timer is set or initialized to an initial set value $T_{SO}$ (i.e., $Tsi = T_{SO}$) and additionally a road-surface irregularities estimation starting flag (simply, a road-surface estimation starting flag) Frsi is set to "1". Therefore, a road-surface irregularities estimation timer comes into operation and thus a count value Trsi of the road-surface irregularities estimation timer begins to increment. The count value Tsi of the count-down timer is decremented every execution cycle of the LDP control, whereas the count value Trsi of the road-surface irregularities estimation timer is incremented every execution cycle during a time period that the state of road-surface estimation starting flag Frsi, defined by Frsi=1, is satisfied. Thereafter, when wheel acceleration dVwi becomes greater than decision threshold value $S_{limt}$ again under a condition where the count value Tsi of the count-down timer is less than predetermined threshold value TsL and greater than "0", that is, $0 < Tsi \leq TsL$, in other words, when the wheel speed (that is, the wheel acceleration) is fluctuating at a substantially constant time period, the count value Tsi of the count-down timer is set again to initial set value $T_{SO}$. Therefore, when the wheel speed is periodically fluctuating, that is, when the wheel acceleration is periodically fluctuating, the count value Trsi of the road-surface irregularities estimation timer continues to increase. In the system of the embodiment, for the reasons discussed below, decision threshold value $S_{limt}$ is arithmetically calculated or map-retrieved as a variable based on host vehicle speed V, from the predetermined host vehicle speed V versus decision threshold value $S_{limt}$ characteristic map of FIG. 6 showing how a decision threshold value $S_{limt}$ has to be varied relative to a host vehicle speed V. As can be appreciated from the preprogrammed characteristic map of FIG. 6 showing the relationship between host vehicle speed V and decision threshold value $S_{limt}$, in a low vehicle speed range ($0 \leq V \leq V_1$) from 0 to a predetermined vehicle speed value $V_1$, decision threshold value $S_{limt}$ is fixed to a predetermined maximum threshold value $S_{limtH}$. In a middle vehicle speed range ($V_1 < V \leq V_2$) from predetermined low vehicle speed $V_1$ to a predetermined high vehicle speed $V_2$ (higher than $V_1$), decision threshold value $S_{limt}$ gradually reduces to a predetermined minimum threshold value $S_{limtL}$, as the host vehicle speed V increases. In an excessively high vehicle speed range ($V_2 < V$) above predetermined high vehicle speed $V_2$, decision threshold value $S_{limt}$ is fixed to predetermined minimum threshold value $S_{limtL}$. On the other hand, initial set value $T_{SO}$ of the count-down timer is arithmetically calculated or map-retrieved as a variable based on host vehicle speed V, from the predetermined host vehicle speed V versus initial set value $T_{SO}$ characteristic map of FIG. 7 showing how an initial set value $T_{SO}$ of the count-down timer has to be varied relative to a host vehicle speed V. As can be appreciated from the preprogrammed characteristic map of FIG. 7 showing the relationship between host vehicle speed V and initial set value $T_{SO}$, in a low vehicle speed range ($0 \leq V \leq V_3$) from 0 to a predetermined vehicle speed value $V_3$, initial set value $T_{SO}$ of the count-down timer is fixed to a predetermined maximum initial set value $T_{SOH}$. In a middle vehicle speed range ($V_3 < V \leq V_4$) from predetermined low vehicle speed $V_3$ to a predetermined high vehicle speed $V_4$ (higher than $V_3$), initial set value $T_{SO}$ gradually reduces to a predetermined minimum initial set value $T_{SOL}$, as the host vehicle speed V increases. In an excessively high vehicle speed range ($V_4 < V$) above predetermined high vehicle speed $V_4$, initial set value $T_{SO}$ is fixed to predetermined minimum initial set value $T_{SOL}$.

This is because the period of fluctuations of wheel acceleration dVwi and the amplitude of fluctuations of wheel acceleration dVwi, in other words, the period of fluctuations of wheel speed Vwi and the amplitude of fluctuations of wheel speed Vwi, both vary depending on at least the host vehicle speed. For the reasons discussed above, on the basis of predetermined V-$S_{limit}$ characteristic of FIG. 6, decision threshold value $S_{limit}$ is fixed to predetermined maximum threshold value $S_{limtH}$ in the low vehicle speed range ($0 \leq V \leq V_1$), and fixed to predetermined minimum threshold value $S_{limtL}$ in the excessively high vehicle speed range ($V_2 < V$), and gradually reduces to predetermined minimum threshold value $S_{limtL}$ in a linear fashion as the host vehicle speed V increases in the middle vehicle speed range ($V_1 < V \leq V_2$). In a similar manner, on the basis of predetermined V-$T_{SO}$ characteristic of FIG. 7, count-down-timer initial set value $T_{SO}$ is fixed to predetermined maximum initial set value $T_{SOH}$ in the low vehicle speed range ($0 \leq V \leq V_3$), and fixed to predetermined minimum initial set value $T_{SOL}$ in the excessively high vehicle speed range ($V_4 < V$), and gradually reduces to predetermined minimum initial set value $T_{SOL}$ in a linear fashion as the host vehicle speed V increases in the middle vehicle speed range ($V_3 < V \leq V_4$).

Figure 8A:
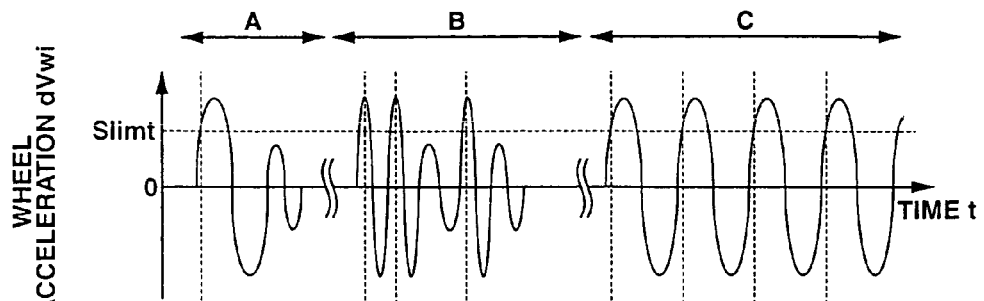
FIGS. 8A-8E are time charts explaining control actions performed by the apparatus of the embodiment executing the LDP control routine shown in FIG. 2.
Figure 8B:
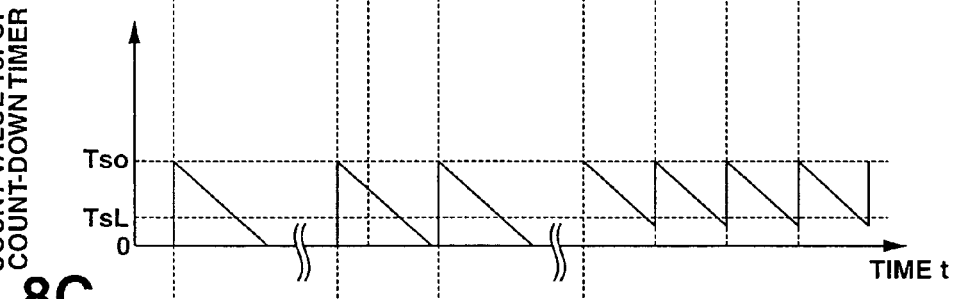
Figure 8C:
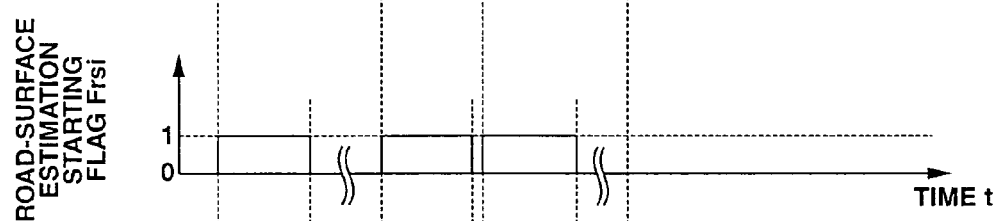
Figure 8D:
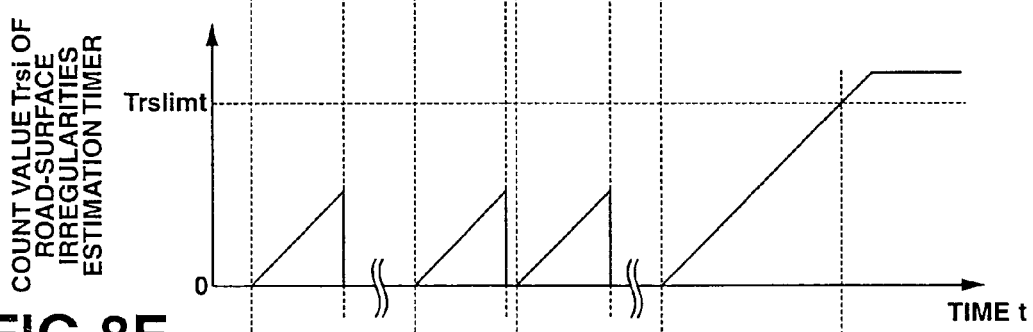

On the contrary, when the count value Tsi of the count-down timer is greater than predetermined threshold value TsL, the count value Tsi of the count-down timer is decremented by a predetermined value, while a count value Trsi of a road-surface irregularities estimation timer is incremented by the predetermined value (see FIGS. 8B and 8D). If the count value Tsi of the count-down timer is less than or equal to "0", road-surface estimation starting flag Frsi is reset to "0" and additionally the count value Trsi of the road-surface irregularities estimation timer is reset to "0".

Conversely when the current value $dVwi_{(k)}$ of wheel acceleration, calculated at the current control cycle, is less than or equal to decision threshold value $S_{limt}$, that is, the condition $dVwi_{(k)} > S_{limt}$ is unsatisfied, or when the previous value $dVwi_{(k-1)}$ of wheel acceleration, calculated one cycle before, is greater than decision threshold value $S_{limt}$, that is, the condition $dVwi_{(k-1)} > S_{limt}$ is satisfied, the count value Tsi of the count-down timer is decremented by the predetermined value, while the count value Trsi of the road-surface irregularities estimation timer is incremented by the predetermined value. If the count value Tsi of the count-down timer is less than or equal to "0", road-surface estimation starting flag Frsi is reset to "0" and additionally the count value Trsi of the road-surface irregularities estimation timer is reset to "0".

With the previously-noted arrangement, as can be seen from the time period C of each of the time charts of FIGS. 8A-8E, when wheel acceleration dVwi becomes greater than decision threshold value $S_{limt}$ (see the time period C of the time chart of FIG. 8A), the count value Tsi of the count-down timer is initialized to initial set value $T_{SO}$ and then gradually decremented (see the time period C of the time chart of FIG. 8B). On the other hand, road-surface estimation starting flag Frsi is set to "1" and also the road-surface irregularities estimation timer comes into operation and then the count value Trsi of the road-surface irregularities estimation timer is gradually incremented (see the time period C of the time chart of FIG. 8D). Thereafter, if wheel acceleration dVwi becomes greater than decision threshold value $S_{limt}$ again during a time interval (0<Tsi≦TsL) from the time when the count value Tsi of the count-down timer becomes less than or equal to predetermined threshold value TsL to the time when the count value Tsi of the count-down timer becomes less than or equal to "0", that is, when wheel speed Vwi tends to increase at a substantially constant time period ($T_{SO}$-TsL), the count value Tsi of the count-down timer is set again to initial set value $T_{SO}$, and then begins to decrement from the initial set value. That is, while wheel acceleration dVwi is fluctuating at a cycle from a time when the count value Tsi of the count-down timer begins to decrement from initial set value $T_{SO}$ to a time when a predetermined condition defined by 0<Tsi≦TsL is satisfied, road-surface estimation starting flag Frsi is kept at "1". As a result of this, as can be seen from the time period C of the time chart of FIG. 8D, the count value Trsi of the road-surface irregularities estimation timer continues to increase (see the relationship between the road-surface estimation starting flag Frsi and the count value Trsi of the road-surface irregularities estimation timer in FIGS. 8C and 8D). When the count value Trsi of the road-surface irregularities estimation timer exceeds a predetermined decision threshold value Trslimt, in other words, when the state that wheel acceleration dVwi periodically exceeds decision threshold value $S_{limt}$ continues for a time period corresponding to predetermined decision threshold value Trslimt, the processor of ECU 8 determines that wheel acceleration dVwi is periodically fluctuating. Thus, a road-surface irregularities decision flag Foti is set to "1" (see the time period C of each of the time charts of FIGS. 8D and 8E).

On the contrary, as can be seen from the time periods A and B of each of the time charts of FIGS. 8A-8E, when the host vehicle momentarily stamps across an obstacle (e.g., a stone) fallen into the road surface or a protruding portion on the road and thus wheel speed Vwi temporarily greatly changes and fluctuates (see the time periods A and B of the time chart of FIG. 8A) and thus wheel acceleration dVwi momentarily exceeds decision threshold value $S_{limt}$, the count value Tsi of the count-down timer is temporarily set to initial set value $T_{SO}$, and simultaneously the road-surface irregularities estimation timer comes into operation. When such a temporary wheel-acceleration fluctuation occurs, the state that wheel acceleration dVwi exceeds decision threshold value $S_{limt}$ cannot repeatedly occur under the predetermined condition defined by 0<Tsi≦TsL. The count value Tsi of the count-down timer gradually reduces down to "0", and finally becomes "0" (see the time periods A and B of the time chart of FIG. 8B). Immediately when the count value Tsi of the count-down timer becomes "0", road-surface estimation starting flag Frsi is reset to "0" and thus the count value Trsi of the road-surface irregularities estimation timer, gradually increasing, becomes "0", (see the time periods A and B of each of the time charts of FIGS. 8B and 8D). As a result, the state Foti=0 of road-surface irregularities decision flag Foti is maintained, and therefore the processor of ECU 8 determines that either one of the steered wheels of the host vehicle is not traveling on the predetermined road-surface irregularities.

Figure 8E:
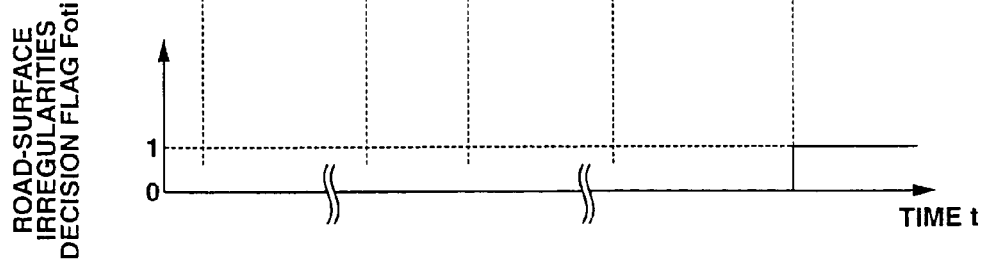

As set forth above, when the count value Trsi of the road-surface irregularities estimation timer is greater than predetermined decision threshold value Trslimt (Trsi>Trslimt), road-surface irregularities decision flag Foti is set to "1" (see the time period C of each of the time charts of FIGS. 8D and 8E). Setting of road-surface irregularities decision flag Foti to "1" means that the road wheel is now traveling on the predetermined irregularities (corresponding to the ridge portions or recessed portions) equidistantly repeatedly formed on the road surface. Conversely when the count value Trsi of the road-surface irregularities estimation timer is less than or equal to predetermined decision threshold value Trslimt (Trsi≦Trslimt), road-surface irregularities decision flag Foti remains reset to "0" (see the time periods A and B of each of the time charts of FIGS. 8D and 8E).

As discussed previously, according to the LDP control system of the embodiment, when wheel speed Vwi is fluctuating or changing at a substantially constant time period ($T_{SO}$-TsL) based on host vehicle speed V, road-surface irregularities decision flag Foti is set (Foti=1). Therefore, only when road wheel 5i is traveling on predetermined road-surface irregularities (the ridged portions or recessed portions), which are equidistantly repeatedly formed on the road surface, the system determines that the host vehicle is running on the predetermined road-surface irregularities. Suppose that road-surface irregularities decision flag Foti is set (Foti=1) when wheel speed Vwi of the host vehicle is merely fluctuating but not changing at a substantially constant period ($T_{SO}$-TsL). In such a way to set the road-surface irregularities decision flag Foti, even when the host vehicle merely stamps across a protruding portion on the road, road-surface irregularities decision flag Foti may be undesirably set to "1". As a result of this, there is a possibility that the system erroneously determines that the host vehicle is traveling on the road-surface irregularities, in particular during the host vehicle's driving on bad roads such as rugged terrain. In the LDP control system of the embodiment, a check for the host vehicle traveling on the predetermined road-surface irregularities can be made accurately, while adequately taking account of the periodical fluctuation in wheel acceleration dVwi, that is, the cyclic fluctuation in wheel speed Vwi.

As discussed above, in the shown embodiment, in order to detect the predetermined artificial road-surface irregularities (artificial ridged portions or artificial recessed portions) equidistantly repeatedly formed on the white lane marker or formed outside of and close to the white lane marker, the LDP control system of the embodiment utilizes the periodical fluctuation in wheel acceleration dVwi (or the periodical fluctuation in wheel speed Vwi). In addition to utilization of the periodical fluctuation in wheel acceleration dVwi (or the periodical fluctuation in wheel speed Vwi) in detecting the predetermined artificial road-surface irregularities, the processor of ECU 8 may be constructed to detect the unpaved driving-lane edge having uneven portions or the unpaved road edge having uneven portions. In such a case, the processor of ECU 8 may determine that either one of the left and right road wheels of the host vehicle is traveling on the uneven portions of the unpaved driving-lane edge or the unpaved road edge, when wheel speed Vwi continuously oscillates for a time period greater than or equal to a preset time period. It is possible to detect the uneven portions of the unpaved driving-lane edge (or the unpaved road edge) as well as the predetermined artificial road-surface irregularities. Subsequently to step S4, step S5 occurs.

At step S5, a check is made to determine, based on road-surface irregularities decision flag $Fot_{FL}$ associated with front-left road wheel 5FL and road-surface irregularities decision flag $Fot_{FR}$ associated with front-right road wheel 5FR, whether the host vehicle is traveling on either one of the leftmost and rightmost edges of the current driving lane. Concretely, when road-surface irregularities decision flag $Fot_{FL}$ associated with front-left road wheel 5FL is set to "1" and road-surface irregularities decision flag $Fot_{FR}$ associated with front-right road wheel 5FR is reset to "0", the processor of ECU 8 determines that the host vehicle is now traveling on the left-hand edge of its driving lane, and thus a road-edge decision flag (or a driving-lane edge decision flag) Fdw is set to "+1". When road-surface irregularities decision flag $Fot_{FL}$ associated with front-left road wheel 5FL is reset to "0" and road-surface irregularities decision flag $Fot_{FR}$ associated with front-right road wheel 5FR is set to "1", the processor of ECU 8 determines that the host vehicle is now traveling on the right-hand edge of its driving lane, and thus a road-edge decision flag (or a driving-lane edge decision flag) Fdw is set to "−1". In contrast to the above, when road-surface irregularities decision flag $Fot_{FL}$ for front-left road wheel 5FL and road-surface irregularities decision flag $Fot_{FR}$ for front-right road wheel 5FR are both set to "1", or when flags $Fot_{FL}$ and $Fot_{FR}$ are both reset to "0", road-edge decision flag Fdw is reset to "0".

As explained previously, according to the LDP control system of the embodiment, only when either one of road-surface irregularities decision flag $Fot_{FL}$ for front-left road wheel 5FL and road-surface irregularities decision flag $Fot_{FR}$ for front-right road wheel 5FR is set to "1", road-edge decision flag Fdw is set (=+1 or −1). Thus, only when either one of front-left and front-right road wheels 5FL and 5FR of the host vehicle is traveling and stamping across the predetermined artificial road-surface irregularities or uneven portions of the unpaved driving-lane edge or uneven portions of the unpaved road edge, the system determines that the host vehicle is running on the road-surface irregularities. Thus, it is possible to prevent the LDP control system from erroneously determining that the host vehicle is traveling on the road-surface irregularities, in particular during the host vehicle's driving on bad roads such as rugged terrain.

At step S6, a check is made to determine, based on direction indicator switch signal WS from direction indicator switch 20 and steer angle δ detected by steer angle sensor 19, whether a driver's intention for lane changing is present or absent. Concretely, at step S6, a check is made to determine whether direction indicator switch 20 is turned ON. When direction indicator switch 20 is turned ON, a further check is made to determine whether the sign of direction indicator switch signal WS is identical to the sign of lateral-displacement estimate XS calculated through step S3 or the sign of lateral displacement X (read through step S1) from the central axis of the current host vehicle's driving lane. When the sign of direction indicator switch signal WS and the sign of lateral-displacement estimate XS (or the sign of lateral displacement X) are identical to each other, the processor of ECU 8 determines that the host vehicle is conditioned in the lane changing state, and thus a lane-changing indicative flag $F_{LC}$ is set to "1". Conversely when the sign of direction indicator switch signal WS and the sign of lateral-displacement estimate XS (or the sign of lateral displacement X) are not identical to each other, the processor of ECU 8 determines that the host vehicle is not conditioned in the lane changing state but there is an increased tendency of the host vehicle's lane deviation, and thus lane-changing indicative flag $F_{LC}$ is reset to "0". Actually, lane-changing indicative flag $F_{LC}$ is held at "1" for a predetermined time interval, such as four seconds, from the time when lane-changing indicative flag $F_{LC}$ has been set to "1" by turning the direction indicator switch 20 ON. This is because there is a possibility that direction indicator switch 20 is manually turned OFF during lane-changing and thus the LDP control may be engaged undesirably. More concretely, a check is made to determine whether direction indicator switch 20 has been switched from the turned-ON state to the turned-OFF state. When switching from the turned-ON state to turned-OFF state has occurred, ECU 8 determines that the current point of time corresponds to the time just after lane-changing operation, and thus a further check is made to determine whether the predetermined time interval, for example four seconds, measured or counted from the time when switching from the turned-ON state of direction indicator switch 20 to turned-OFF state has occurred, has expired. When the predetermined time interval (e.g., 4 seconds) has expired, lane-changing indicative flag $F_{LC}$ is reset to "0".

Taking into account the driver's steering operation under a condition that direction indicator switch 20 remains turned OFF, a still further check for the presence or absence of the driver's intention for lane changing is made based on steer angle δ and a variation Δδ in steer angle δ. Concretely, with direction indicator switch 20 turned OFF, a check is made to determine whether steer angle δ is greater than or equal to a predetermined steer angle $δ_s$ and additionally a variation Δδ in steer angle δ is greater than or equal to a predetermined change $Δδ_s$. In case of $δ≧δ_s$ and $Δδ≧Δδ_s$, ECU 8 determines that a driver's intention for lane changing is present, and thus lane-changing indicative flag $F_{LC}$ is set to "1". Conversely in case of $δ<δ_s$ or $Δδ<Δδ_s$, ECU 8 determines that a driver's intention for lane changing is absent, and thus lane-changing indicative flag $F_{LC}$ is reset to "0". Thereafter, the routine proceeds from step S6 to step S7 (described later). As discussed above, in the shown embodiment, the presence or absence of the driver's intention for lane changing is determined based on both of steer angle δ and its change Δδ. In lieu thereof, the presence or absence of the driver's intention for lane changing may be determined based on the magnitude of steering torque acting on the steering wheel.

At step S7, a check is made to determine, based on the absolute value |XS| of lateral-displacement estimate XS (exactly, a comparison result of lateral-displacement estimate absolute value |XS| and a predetermined alarm criterion $X_W$) and setting or resetting of lane-changing indicative flag $F_{LC}$, whether a visual and/or audible warning for the increased host vehicle's lane-deviation tendency should be signaled to the driver. Concretely, a check is made to determine whether lane-changing indicative flag $F_{LC}$ is reset to "0" and additionally the absolute value |XS| of lateral-displacement estimate XS is greater than or equal to predetermined alarm criterion $X_W$ (exactly, a predetermined alarm criterion threshold value). Predetermined alarm criterion $X_W$ is obtained by subtracting a predetermined margin $X_m$ (a predetermined constant) from a predetermined lateral-displacement criterion $X_C$ (see the following expression (3)).

$$X_W = X_C − X_m \qquad (3)$$

where lateral-displacement criterion $X_C$ means a preset criterion threshold value of lateral displacement of the host vehicle from the central axis of the current host vehicle's driving lane, and predetermined margin $X_m$ corresponds to a margin from a time when warning system 23 has been switched to an operative state to a time when the LDP function has been engaged or enabled. For instance, lateral-displacement criterion $X_C$ is set to 0.8 meter, since a width of a traffic lane of an express-highway in Japan is 3.35 meters. In case of $F_{LC}=0$ and $|XS| \geq X_W$, ECU 8 determines that the host vehicle is in a lane-deviation state where there is an increased tendency for the host vehicle to deviate from the current host vehicle's driving lane, and thus the output interface of ECU 8 generates alarm signal AL to warning system 23. On the contrary, in case of $F_{LC}=1$ or $|XS|<X_W$, ECU 8 determines that the host vehicle is out of the lane-deviation state, and thus another check is made to determine whether or not warning system 23 is in operation. During operation of warning system 23, another check is made to determine whether the absolute value $|XS|$ of lateral-displacement estimate XS is less than a difference $(X_W-X_h)$ between predetermined alarm criterion $X_W$ and a predetermined hysteresis $X_h$. Predetermined hysteresis $X_h$ is provided to avoid undesirable hunting for warning system 23. In case of $|XS|<(X_W-X_h)$, warning system 23 is deactivated by stopping the output of alarm signal AL to warning system 23. That is to say, until the lateral-displacement estimate XS is transferred to the state defined by $|XS|<(X_W-X_h)$ after warning system 23 has been activated, the warning operation of warning system 23 is continually executed. In the system of the shown embodiment, the visual and/or audible warning (the output of alarm signal AL to warning system 23) is dependent upon only the amount of lateral displacement (exactly, the absolute value $|XS|$ of lateral-displacement estimate XS). In the LDP control system of the embodiment shown in FIGS. 1 and 2, lateral-displacement criterion $X_C$ is fixed to a predetermined constant value. Actually, a lane width L of each of driving lanes is not fixed constant. Thus, lateral-displacement criterion $X_C$ may be a variable, which is determined depending on lane width L of each of driving lanes. For instance, the lane width L itself can be obtained by image-processing the picture image data from CCD camera 13 or by extracting input information regarding the lane width of the current driving lane as map data, utilizing a navigation system. In this case, lateral-displacement criterion $X_C$, which is a variable, can be calculated from the following expression.

$$X_C = \min\{(L/2 L_0/2), 0.8\}$$

where $L_0$ denotes a host vehicle's width and L denotes a lane width. As can be appreciated from the above expression, lateral-displacement criterion $X_C$ is obtained as a lower one of the value $(L/2-L_0/2)$ and 0.8 (unit: meter) by way of a so-called select-LOW process.

In lieu thereof, in case of an automated highway equipped with an infrastructure, a distance data (L/2−XS), which is obtained and received by way of mutual communication between the host vehicle and the on-road network (or the on-road sensor or the on-road lane marker) contained in the infrastructure, may be used as input information regarding an estimate of lateral-displacement criterion $X_C$. Subsequently to step S7, step S8 occurs.

At step S8, the processor of ECU 8 makes a lane-deviation decision based on the picture image data concerning the white lane marker in front of the host vehicle, in other words, a comparison result between lateral-displacement estimate XS and lateral-displacement criterion $X_C$, so as to determine whether there is a possibility or an increased tendency of lane deviation of the host vehicle from the current driving lane. Concretely, at step S8, a check is made to determine whether lateral-displacement estimate XS is greater than or equal to lateral-displacement criterion $X_C$ (a positive lane-deviation criterion). In case of $XS \geq X_C$, the processor of ECU 8 determines that there is an increased tendency for the host vehicle to deviate from the current driving lane to the left, and thus a lane-deviation decision flag $F_{LD}$ is set to "+1". In case of $XS<X_C$, another check is made to determine whether lateral-displacement estimate XS is less than or equal to a negative value $-X_C$ of lateral-displacement criterion $X_C$. In case of $XS \leq -X_C$, the processor of ECU 8 determines that there is an increased tendency for the host vehicle to deviate from the current driving lane to the right, and therefore lane-deviation decision flag $F_{LD}$ is set to "−1". Alternatively, when the condition defined by $XS \geq X_C$ and the condition defined by $XS \leq -X_C$ are both unsatisfied, that is, in case of $-X_C<XS<X_C$, the processor of ECU 8 determines that there is a less possibility of the host vehicle's lane deviation from the current driving lane to the right or to the left, and thus lane-deviation decision flag $F_{LD}$ is reset to "0".

At the same time, at step S8, a compensation for lane-deviation decision flag $F_{LD}$ and road-edge decision flag Fdw is made based on lane-changing indicative flag $F_{LC}$. Concretely, a further check is made to determine whether lane-changing indicative flag $F_{LC}$ is set to "1". In case of $F_{LC}=1$, in order to prevent LDP control, lane-deviation decision flag $F_{LD}$ is forcibly reset to "0" even under the condition defined by $F_{LD}=+1$ or $F_{LD}=-1$ and additionally road-edge decision flag Fdw is forcibly reset to "0" even under the condition defined by Fdw=+1 or Fdw=−1. In a similar manner, when a tire grip on the road reaches a limit, in other words, during skid control (ABS control), during traction control (TCS control), or during vehicle dynamics control (VDC control), the LDP control has to be generally inhibited. Thus, during skid control, during traction control, or during vehicle dynamics control, lane-deviation decision flag $F_{LD}$ is also forcibly reset to "0".

As discussed above, after the lane-deviation decision based on the picture image data concerning the white lane marker, in other words, after the lane-deviation decision under the lane-marker recognizable state (Fcr=1) through step S8, step S9 occurs.

At step S9, a check is made to determine whether road-edge decision flag Fdw is set (Fdw≠0) or reset (Fdw=0). When ECU 8 determines that the host vehicle is not traveling on either one of the left-hand edge and the right-hand edge of its driving lane, that is, in case of Fdw=0, the routine proceeds from step S9 to step S10. Conversely when Fdw≠0 (i.e., Fdw=+1 or Fdw=−1), the routine proceeds from step S9 to step S11.

At step S10, a desired yaw moment Ms, needed to avoid the host vehicle's lane-deviation tendency by execution of LDP control achieved by way of only the yaw moment control, is arithmetically calculated or derived, depending on the state of lane-deviation decision flag $F_{LD}$, as follows.

Figure 9:
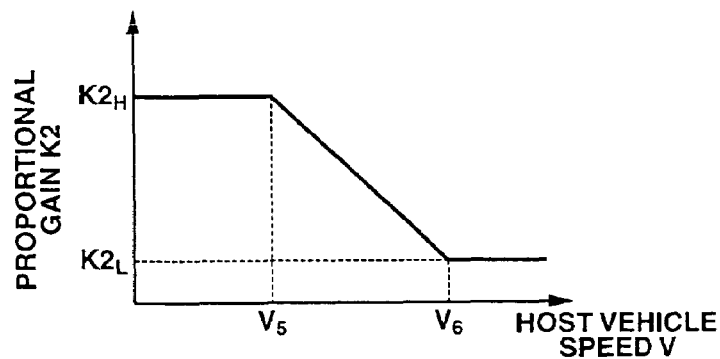
FIG. 9 is a predetermined host vehicle speed V versus proportional gain K2 characteristic map used for the LDP control routine of FIG. 2.

First, a check is made to determine whether lane-deviation decision flag $F_{LD}$ is kept at the set state ($F_{LD}=+1$ or −1), in other words, $F_{LD} \neq 0$. In case of $F_{LD} \neq 0$, that is, when the processor of ECU 8 determines, based on the difference (XS−$X_C$) between lateral-displacement estimate XS and predetermined lateral-displacement criterion $X_C$, that there is an increased tendency for the host vehicle to deviate from the driving lane, desired yaw moment Ms is arithmetically calculated from the following expression (4).

$$Ms = -K1 \times K2 \times (XS-X_C) \qquad (4)$$

where K1 denotes a proportional gain that is determined by specifications of the host vehicle, and K2 denotes a proportional gain that is determined by host vehicle speed V and retrieved based on the latest up-to-date informational data of host vehicle speed v from the predetermined host vehicle speed V versus proportional gain K2 characteristic map of FIG. 9 showing how a proportional gain K2 has to be varied relative to a host vehicle speed V. In the shown embodiment, as can be appreciated from the preprogrammed characteristic map of FIG. 9 showing the relationship between host vehicle speed V and proportional gain K2, in a low vehicle speed range ($0 \leq V \leq V_5$) from 0 to a predetermined vehicle speed value $V_5$, proportional gain K2 is fixed to a predetermined maximum gain $K2_H$. In a middle vehicle speed range ($V_5 < V \leq V_6$) from predetermined low vehicle speed $V_5$ to a predetermined high vehicle speed $V_6$ (higher than $V_5$), proportional gain K2 gradually reduces to a predetermined minimum gain $K2_L$, as the host vehicle speed V increases. In an excessively high vehicle speed range ($V_6 < V$) above predetermined high vehicle speed $V_6$, proportional gain K2 is fixed to predetermined minimum gain $K2_L$.

Conversely when $F_{LD}=0$, desired yaw moment Ms is set to "0" through step S10, that is, Ms=0. In the presence of the flow from step S9 to step S10, road-edge decision flag Fdw is in the reset state (Fdw=0), and thus a desired deceleration rate Xgs (described later in reference to step S12) is set to "0", since there is no need for vehicle deceleration control under the condition of Fdw=0.

On the contrary when the host vehicle is traveling on the road edge or either one of the leftmost and rightmost edges of the current driving lane and thus road-edge decision flag Fdw is set (Fdw≠0), the system of the embodiment executes vehicle deceleration control as well as yaw moment control for lane deviation avoidance. For this reason, the routine flows from step S9 to step S11.

Figure 10:
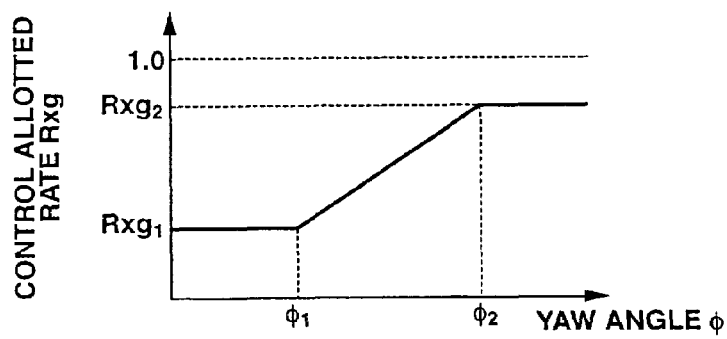
FIG. 10 is a predetermined yaw angle $\phi$ versus control allotted rate Rxg characteristic map used for the LDP control routine of FIG. 2.

At step S11, control allotment between yaw moment control and vehicle deceleration control, exactly a control allotted rate Rxg of vehicle deceleration control to yaw moment control, is calculated and determined based on the host vehicle's yaw angle ϕ with respect to the sense of the current host vehicle's driving lane. Concretely, control allotted rate Rxg is computed or map-retrieved from the predetermined yaw angle ϕ versus control allotted rate Rxg characteristic map shown in FIG. 10. In the shown embodiment, control allotted rate Rxg is set to a positive value less than +1.0, that is, 0<Rxg<+1.0. In FIG. 10, the axis of ordinate indicates control allotted rate Rxg, whereas the axis of abscissa indicates the host vehicle's yaw angle ϕ. In the shown embodiment, as can be appreciated from the preprogrammed ϕ-Rxg characteristic map of FIG. 10, in a small yaw angle range ($0 \leq \phi \leq \phi_1$) from 0 to a predetermined yaw angle $\phi_1$, control allotted rate Rxg is fixed to a predetermined minimum rate $Rxg_1$. In a middle yaw angle range ($\phi_1 < \phi \leq \phi_2$) from predetermined small yaw angle $\phi_1$ to a predetermined large yaw angle $\phi_2$ (larger than $\phi_1$, control allotted rate Rxg gradually increases to a predetermined maximum rate $Rxg_2$, as the yaw angle ϕ increases. In an excessively large yaw angle range ($\phi_2 < \phi$) above predetermined large yaw angle $\phi_2$, control allotted rate Rxg is fixed to predetermined maximum rate $Rxg_2$. As discussed above, in the shown embodiment, control allotted rate Rxg is determined based on the host vehicle's yaw angle ϕ. In lieu thereof, control allotted rate Rxg may be determined based on at least one of host vehicle speed V, curvature β of the host vehicle's driving lane, yaw rate ϕ', lateral acceleration Yg, and the other host vehicle's driving state indicative data and traveling-path condition indicative data.

Figure 11:
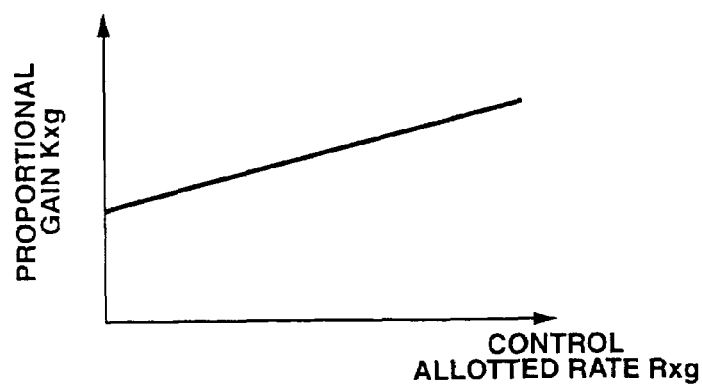
FIG. 11 is a predetermined control allotted rate Rxg versus proportional gain Kxg characteristic map used for the LDP control routine of FIG. 2.

At step S12, desired deceleration rate Xgs to be generated by vehicle deceleration control is determined depending on the state of lane-deviation decision flag $F_{LD}$. In case of $F_{LD} \neq 0$, that is, $F_{LD}=+1$ or $F_{LD}=-1$, desired deceleration rate Xgs is arithmetically calculated based on the difference ($XS-X_C$) between lateral-displacement estimate XS and predetermined lateral-displacement criterion $X_C$ from the following expression (5).

$$Xgs = -Kxg \times (XS - X_C) \qquad (5)$$

where Kxg denotes a proportional gain that is determined by control allotted rate Rxg and retrieved based on the latest up-to-date informational data of control allotted rate Rxg from the predetermined control allotted rate Rxg versus proportional gain Kxg characteristic map of FIG. 11 showing how a proportional gain Kxg has to be varied relative to a control allotted rate Rxg. As can be seen from the preprogrammed Rxg-Kxg characteristic map of FIG. 11, proportional gain Kxg is set as a monotone function that proportional gain Kxg increases in a linear fashion, as control allotted rate Rxg increases. Conversely when $F_{LD}=0$, desired deceleration rate Xgs is set to "0" through step S12, that is, Xgs=0. After desired deceleration rate Xgs has been set through step S12, the routine proceeds to step S13.

Figure 12:
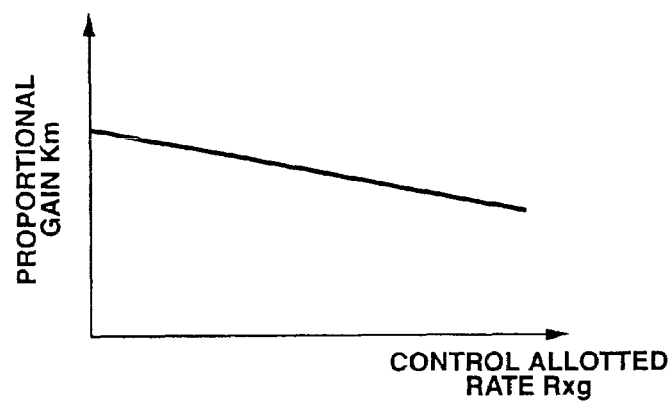
FIG. 12 is a predetermined control allotted rate Rxg versus proportional gain Km characteristic map used for the LDP control routine of FIG. 2.

At step S13, desired yaw moment Ms, to be exerted on the host vehicle by way of yaw moment control executed in parallel with vehicle deceleration control, is arithmetically calculated, depending on the state of lane-deviation decision flag $F_{LD}$. In case of $F_{LD} \neq 0$, that is, when the processor of ECU 8 determines, based on the difference ($XS-X_C$) between lateral-displacement estimate XS and predetermined lateral-displacement criterion $X_C$, that there is an increased tendency for the host vehicle to deviate from the driving lane, desired yaw moment Ms is arithmetically calculated from the following expression (6).

$$Ms = -Km \times K1 \times K2 \times (XS - X_C) \qquad (6)$$

where K1 and K2 denote the proportional gains previously described in reference to the expression (4), and Km denotes a proportional gain that is determined or retrieved based on the latest up-to-date informational data of control allotted rate Rxg (set through step S11) from the predetermined control allotted rate Rxg versus proportional gain Km characteristic map of FIG. 12 showing how a proportional gain Km has to be varied relative to a control allotted rate Rxg. In the shown embodiment, as can be seen from the preprogrammed Rxg-Km characteristic map of FIG. 12, proportional gain Km is set as a monotone function that proportional gain Km decreases in a linear fashion, as control allotted rate Rxg increases. Conversely when $F_{LD}=0$, desired yaw moment Ms is set to "0" through step S13, that is, Ms=0. In this manner, after desired yaw moment Ms has been arithmetically calculated through steps S10 or S13, the routine proceeds to step S14.

At step S14, desired braking forces for the individual road wheels, that is, front-left, front-right, rear-left, and rear-right desired wheel-brake cylinder pressures $Ps_{FL}$, $Ps_{FR}$, $Ps_{RL}$ and $Ps_{RR}$, which are collectively referred to as "Psi", are calculated based on master cylinder pressure Pm read through step S1, desired yaw moment Ms determined through steps S10 or S13, and desired deceleration rate Xgs determined through step S12. Suppose that brake pedal is depressed by the driver's foot and thus the brakes are applied during the automatic vehicle deceleration control. There is a possibility of undesirable interference between the host vehicle's decelerating action based on vehicle deceleration control executed during the LDP control mode and the host vehicle's decelerating action based on the driver's brake-pedal depression. To avoid such undesirable interference, the following select-HIGH process is performed as follows.

First, an equivalent controlled master-cylinder pressure Pmcnt is arithmetically calculated based on desired deceleration rate Xgs from the following expression (7).

$$Pmcnt = Kmxg \times Xgs \qquad (7)$$

where Kmxg denotes a conversion coefficient that is determined by specifications of the host vehicle.

Second, a so-called select-HIGH processed master-cylinder pressure, simply, a selected master-cylinder pressure Pmsel is calculated from the following expression.

$$Pmsel = max\{Pmcnt, Pm\}$$

where Pmcnt denotes the equivalent controlled master-cylinder pressure calculated based on desired deceleration rate Xgs, and Pm denotes the master-cylinder pressure detected by master-cylinder pressure sensor 17. As can be appreciated from the above expression, selected master-cylinder pressure Pmsel is obtained as a higher one of the equivalent controlled master-cylinder pressure Pmcnt based on desired deceleration rate Xgs and master-cylinder pressure Pm detected.

Next, desired wheel-brake cylinder pressures Psi are calculated based on the state of lane-deviation decision flag $F_{LD}$ and the state of road-edge decision flag Fdw.

Concretely, in case of $F_{LD}=0$ (whose lane-deviation decision flag $F_{LD}$ setting or resetting state is determined through step S8) and Fdw=0 (whose road-edge decision flag Fdw setting or resetting state is determined through step S5), that is, when there is a less tendency for the host vehicle to deviate from the driving lane and the host vehicle is not traveling on the road-surface irregularities, front-left and front-right desired wheel-brake cylinder pressures $Ps_{FL}$ and $Ps_{FR}$ for front wheel-brake cylinders 6FL and 6FR are set to selected master-cylinder pressure Pmsel (see the following expressions), whereas rear-left and rear-right desired wheel-brake cylinder pressures $Ps_{RL}$ and $Ps_{RR}$ for rear wheel-brake cylinders 6RL and 6RR are set to a rear-wheel brake pressure or a rear-wheel master-cylinder pressure PmR (see the following expressions), which is calculated and usually reduced from master-cylinder pressure Pm, while taking into account wheel-brake cylinder pressure distribution between front and rear wheel brakes.

$$Ps_{FL} = Pmsel$$

$$Ps_{FR} = Pmsel$$

$$Ps_{RL} = PmR$$

$$Ps_{RR} = PmR$$

In contrast to the above, during operation of the LDP control system (in case of $F_{LD} \neq 0$, that is, $F_{LD}=+1$ or $F_{LD}=-1$), or in the set state of road-edge decision flag Fdw (in case of Fdw≠0, that is, Fdw=+1 or Fdw=-1), in other words, when there is an increased tendency for the host vehicle to deviate from the driving lane or when the host vehicle is traveling on the road edge or either one of the driving-lane leftmost and rightmost edges, each of desired front and rear wheel-brake cylinder pressures $Ps_{FL}$, $Ps_{FR}$, $Ps_{RL}$ and $Ps_{RR}$ is calculated based on the magnitude of desired yaw moment Ms. Concretely, when the absolute value |Ms| of desired yaw moment Ms is less than a predetermined desired yaw-moment threshold value Ms0, (i.e., |Ms|<Ms0), the processor of ECU 8 determines each of desired wheel-brake cylinder pressures $Ps_{FL}$ through $Ps_{RR}$ in such a manner as to provide only the differential pressure between rear road wheels 5RL and 5RR. In other words, the differential pressure between front road wheels 5FL and 5FR is set to "0". Thus, in case of |Ms|<Ms0, the front desired wheel-brake cylinder pressure difference $\Delta Ps_F$ between front-left and front-right desired wheel-brake cylinder pressures $Ps_{FL}$ and $Ps_{FR}$, and the rear desired wheel-brake cylinder pressure difference $\Delta Ps_R$ between rear-left and rear-right desired wheel-brake cylinder pressures $Ps_{RL}$ and $Ps_{RR}$ are determined from the following expression (8).

$$\Delta Ps_F = 0$$

$$\Delta Ps_R = 2 \times Kb_R \times |Ms|/T \qquad (8)$$

where $Kb_R$ denotes a predetermined conversion coefficient used to convert a rear-wheel braking force into a rear wheel-brake cylinder pressure and T denotes a rear-wheel tread (or a rear-wheel track). In the shown embodiment, the rear-wheel track T is set to be identical to a front-wheel track.

Conversely when the absolute value |Ms| of desired yaw moment Ms is greater than or equal to predetermined threshold value Ms0, (i.e., |Ms|≧Ms0), the processor of ECU 8 determines each of desired wheel-brake cylinder pressures $Ps_{FL}$ through $Ps_{RR}$ in such a manner as to provide both of the differential pressure between front road wheels 5FL and 5FR and the differential pressure between rear road wheels 5RL and 5RR. In this case, front and rear desired wheel-brake cylinder pressure differences $\Delta Ps_F$ and $\Delta Ps_R$ are represented by the following expressions (9) and (10).

$$\Delta Ps_F = 2 \times Kb_F \times (|Ms| - Ms0)/T \qquad (9)$$

$$\Delta Ps_R = 2 \times Kb_R \times Ms0/T \qquad (10)$$

where $Kb_F$ denotes a predetermined conversion coefficient used to convert a front-wheel braking force into a front wheel-brake cylinder pressure, $Kb_R$ denotes a predetermined conversion coefficient used to convert a rear-wheel braking force into a rear wheel-brake cylinder pressure, T of the expression (9) and T of the expression (10) denote front and rear wheel treads being the same in front and rear wheels, and Ms0 denotes the predetermined desired yaw-moment threshold value.

In setting front and rear desired wheel-brake cylinder pressure differences $\Delta Ps_F$ and $\Delta Ps_R$ in case of |Ms|≧Ms0, the system of the embodiment actually determines both of the front and rear desired brake fluid pressure differences $\Delta Ps_F$ and $\Delta Ps_R$ based on the above expressions (9) and (10). Instead of producing the desired yaw-moment controlled variable needed for LDP control by creating both of the front and rear desired brake fluid pressure differences $\Delta Ps_F$ and $\Delta Ps_R$, the desired yaw moment may be produced by only the front desired wheel-brake cylinder pressure difference $\Delta Ps_F$. In such a case, front and rear desired wheel-brake cylinder pressure differences $\Delta Ps_F$ and $\Delta Ps_R$ are obtained from the following expressions.

$$\Delta Ps_R = 0$$

$$\Delta Ps_F = 2 \cdot Kb_F \cdot |Ms|/T$$

Therefore, when desired yaw moment Ms is a negative value (Ms<0), in other words, the host vehicle tends to deviate from the current driving lane to the left and thus lane-deviation decision flag $F_{LD}$ is set to "+1", in order to produce the component of yaw moment vector needed to rotate the host vehicle to the right, front-left desired wheel-brake cylinder pressure $Ps_{FL}$ is set to selected master-cylinder pressure Pmsel, front-right desired wheel-brake cylinder pressure $Ps_{FR}$ is set to the sum (Pmsel+$\Delta Ps_F$) of selected master-cylinder pressure Pmsel and front desired wheel-brake cylinder pressure difference $\Delta Ps_F$, rear-left desired wheel-brake cylinder pressure $Ps_{RL}$ is set to rear-wheel master-cylinder pressure PmR, and rear-right desired wheel-brake cylinder pressure $Ps_{RR}$ is set to the sum (PmR+$\Delta Ps_R$) of rear-wheel master-cylinder pressure PmR and rear desired wheel-brake cylinder pressure difference $\Delta Ps_R$ (see the following expression (11)).

$$Ps_{FL}=Pmsel$$

$$Ps_{FR}=Pmsel+\Delta Ps_F$$

$$Ps_{RL}=PmR$$

$$Ps_{RR}=PmR+\Delta Ps_R \quad (11)$$

On the contrary, when desired yaw moment Ms is a positive value (Ms≧0), in other words, the host vehicle tends to deviate from the current driving lane to the right and thus lane-deviation decision flag $F_{LD}$ is set to "−1", in order to produce the component of yaw moment vector needed to rotate the host vehicle to the left, front-left desired wheel-brake cylinder pressure $Ps_{FL}$ is set to the sum (Pm+$\Delta Ps_F$) of selected master-cylinder pressure Pmsel and front desired wheel-brake cylinder pressure difference $\Delta Ps_F$, front-right desired wheel-brake cylinder pressure $Ps_{FR}$ is set to selected master-cylinder pressure Pmsel, rear-left desired wheel-brake cylinder pressure $Ps_{RL}$ is set to the sum (PmR+$\Delta Ps_R$) of rear-wheel master-cylinder pressure PmR and rear desired wheel-brake cylinder pressure difference $\Delta Ps_R$, and rear-right desired wheel-brake cylinder pressure $Ps_{RR}$ is set to rear-wheel master-cylinder pressure PmR (see the following expression (12)).

$$Ps_{FL}=Pmsel+\Delta Ps_F$$

$$Ps_{FR}=Pmsel$$

$$Ps_{RL}=PmR+\Delta Ps_R$$

$$Ps_{RR}=PmR \quad (12)$$

Simultaneously, at step S14, a desired driving torque TrqDS is arithmetically calculated as detailed hereunder, under a particular condition where there is a possibility that the host vehicle tends to deviate from the current driving lane and the LDP control is operative ($F_{LD}\ne 0$). In the shown embodiment, under the specified condition defined by $F_{LD}\ne 0$ (i.e., $F_{LD}$=+1 or $F_{LD}$=−1) or Fdw≠0 (i.e., Fdw=+1 or Fdw=−1), that is, when the LDP control system is in operation, vehicle acceleration is reduced or suppressed by decreasingly compensating for the engine output even when the accelerator pedal is depressed by the driver. Concretely, in case of $F_{LD}\ne 0$ or Fdw≠0, desired driving torque TrqDS is calculated from the following expression.

$$TrqDS=f(Acc)-g(Ps)$$

where f(Acc) is a function of accelerator opening Acc read through step S1 and the function f(Acc) is provided to calculate a desired driving torque that is determined based on the accelerator opening Acc and required to accelerate the host vehicle, and g(Ps) is a function of a sum Ps (=$\Delta Ps_F$+$\Delta Ps_R$+Pmcnt) of front and rear desired wheel-brake cylinder pressure differences $\Delta Ps_F$ and $\Delta Ps_R$ and equivalent controlled master-cylinder pressure Pmcnt, and the function g(Ps) is provided to calculate a desired braking torque based on the summed value Ps (=$\Delta Ps_F$+$\Delta Ps_R$+Pmcnt).

Therefore, when the condition defined by $F_{LD}\ne 0$ (that is, $F_{LD}$=+1 or −1) or Fdw≠0 (that is, Fdw=1 or −1) is satisfied, and thus the LDP control is executed, the engine torque output is reduced by the braking torque created based on the summed value Ps (=$\Delta Ps_F$+$\Delta Ps_R$+Pmcnt).

On the contrary, when the condition defined by $F_{LD}$=0 and Fdw=0 is satisfied, desired driving torque TrqDS is determined based on only the driving torque component needed to accelerate the host vehicle (see the following expression).

$$TrqDS=f(Acc)$$

In the shown embodiment, a higher priority is put on the controlled variable of LDP control rather than the manipulated variable of the accelerator pedal by the driver. In lieu thereof, it will be appreciated that the invention is not limited to the particular embodiment shown and described herein, but a higher priority may be put on the manipulated variable of the accelerator pedal by the driver rather than the controlled variable of LDP control, such that the absolute value |Ms| of desired yaw moment Ms decreases, as the accelerator opening Acc increases. Subsequently to step S14, step S15 occurs.

At step S15, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through step S14, are output from the input interface of ECU 8 to hydraulic modulator 7, and at the same time a command signal corresponding to desired driving torque TrqDS, calculated through the same step S14, is output from the output interface of ECU 8 to driving torque control unit 12. In this manner, one cycle of the time-triggered interrupt routine (the LDP control routine executed by the system of the embodiment) terminates and the predetermined main program is returned.

The automotive LDP apparatus of the embodiment executing the LDP control routine shown in FIG. 2 operates as follows.

Figure 13:
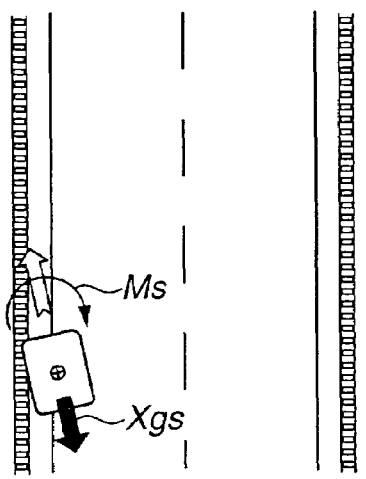
FIG. 13 is an explanatory view showing two control actions, namely yaw moment control indicated by a character Ms and vehicle deceleration control indicated by a character Xgs, performed by the apparatus of the embodiment executing the LDP control routine shown in FIG. 2.

As can be seen from the explanatory view of FIG. 13, suppose that the host vehicle is traveling on the driving lane having the rumble strip artificially formed on each of left and right white lane markers or equidistantly repeatedly formed outside of and close to the respective white lane marker. When the host vehicle is traveling on or along the centerline of the driving lane, the condition defined by |XS|≧$X_W$ is unsatisfied, in other words, the condition defined by |XS|<$X_W$ is satisfied. Thus, through step S7, warning system 23 is kept in an inoperative state. The condition defined by |XS|≧$X_c$ is also unsatisfied, in other words, the condition defined by |XS|<Xc is satisfied and thus lane-deviation decision flag $F_{LD}$ is reset to "0" through step S8. Additionally, neither of the road wheels of the host vehicle is traveling on the road-surface irregularities (the rumble strip) and thus there is no periodic fluctuation of wheel acceleration dVwi. Thus, road-surface irregularities decision flag $Fot_{FL}$ associated with front-left road wheel 5FL and road-surface irregularities decision flag $Fot_{FR}$ associated with front-right road wheel 5FR are both reset to "0". As a result, the processor of ECU 8 of the LDP apparatus of the embodiment determines that the host vehicle is not traveling on the road edge (either one of the leftmost and rightmost edges of the current driving lane), and thus road-edge decision flag Fdw is reset to "0", that is, Fdw=0 (see steps S4-S5 of FIG. 2). Therefore, the routine proceeds from step S9 to step S10. At this time, desired yaw moment Ms is set to "0" and desired deceleration rate Xgs is set to "0", since there is a less lane-deviation tendency of the host vehicle, that is, $F_{LD}$=0. There is no generation of yaw moment based on LDP control and no generation of braking/driving torque based on LDP control. In this manner, when there is a less lane-deviation tendency of the host vehicle, that is, in case of $F_{LD}$=0, as can be appreciated from the flow from step S9 through steps S10 and S14 to step S15, the host vehicle's dynamic behavior can be determined by the driver's manual steering operation, brake-pedal depression, and accelerator-pedal depression.

After this, suppose that the host vehicle tends to deviate from the centerline of the current driving lane to the left owing to the driver's inattentive driving, for example. Under these conditions, within the processor of ECU 8, first, input informational data from the previously-noted engine/vehicle switches and sensors, and driving-torque controller 12 and camera controller 14 are read (see step S1 of FIG. 2). Recognition flag Fcr is set to "1", since the white lane marker in front of the host vehicle is satisfactorily detected and captured by CCD camera 13. Next, at step S2, host vehicle speed V is calculated from the expression $V=(Vw_{FL}+Vw_{FR})/2$. Due to the host vehicle's lane deviation tendency gradually increasing, lateral-displacement estimate XS ($=Tt \times V \times (\phi+Tt \times V \times \beta)+X$), calculated through step S3, gradually increases. As soon as lateral-displacement estimate XS becomes greater than predetermined alarm criterion $X_W$, that is, $XS>X_W$, warning system 23 comes into operation so that a visual and/or audible warning is signaled to the driver. The driver is informed of the increased lane-deviation tendency of the host vehicle. At the point of time when lateral-displacement estimate XS exceeds predetermined alarm criterion $X_W$, the condition defined by $|XS|>X_C$ is not yet satisfied, lane-deviation decision flag $F_{LD}$ remains reset ($F_{LD}=0$), and thus there is no generation of yaw moment based on LDP control. Assuming that direction indicator switch 20 has been manually turned ON under such a condition where lateral-displacement estimate XS is gradually increasing, warning system 23 is held at the deactivated state with lane-changing indicative flag $F_{LC}$ set ($F_{LC}=1$).

Suppose that lateral-displacement estimate XS is further increasing after the condition defined by $XS>X_W$ has been satisfied. At this time, lateral-displacement estimate XS reaches predetermined lateral-displacement criterion $X_C$. As soon as lateral-displacement estimate XS exceeds predetermined lateral-displacement criterion $X_C$ and then the condition defined by $|XS| \geq X_C$ is satisfied, lane-deviation decision flag $F_{LD}$ is set ($F_{LD}=1$). At the point of time, suppose that the host vehicle comes nearer to the left white lane marker of the driving lane, but still travels within the left white lane marker. Therefore, the host vehicle does not yet on the road-surface irregularities (the rumble strip). For this reason, there is no periodical fluctuation in wheel acceleration dVwi of front-left road wheel 5FL, and thus ECU 8 determines that the host vehicle is not traveling on the road edge (the leftmost edge of the current driving lane). As a result, the resetting state (Fdw=0) of road-edge decision flag Fdw is maintained. Therefore, the routine flows from step S8 through step S9 to step S10. Through step S10, the LDP control is executed by way of only the yaw moment control. With lane-deviation decision flag $F_{LD}$ set to "+1" ($F_{LD}=+1$), desired yaw moment Ms is calculated based on the difference ($XS-X_C$) between lateral-displacement estimate XS and predetermined lateral-displacement criterion $X_C$, from the expression $Ms=-K1 \times K2 \times (XS-X_C)$. Thus, a suitable yaw moment, produced by LDP control based on only the yaw moment control without vehicle deceleration control, is exerted on the host vehicle so as to effectively suppress the host vehicle's lane deviation from the driving lane to the left and to rapidly reduce the host vehicle's lateral displacement from the center axis of the current driving lane.

In contrast to the above, suppose that the host vehicle further deviates to the left and as a result there is a transition from a state where the host vehicle travels within the left and right white lane markers of the current driving lane to a state where front-left road wheel 5FL of the host vehicle travels on the rumble strip. In such a case, wheel acceleration dVwi of front-left road wheel 5FL begins to periodically fluctuate. Thus, ECU 8 determines, through step S4 of the LDP control routine of FIG. 2, that the host vehicle is now traveling on the road-surface irregularities. At step S5, ECU 8 determines that the host vehicle is now traveling on the left-hand edge of the current driving lane, and thus road-edge decision flag Fdw is set to "+1". Owing to Fdw=+1, the routine flows from step S9 through steps S11-S13 to step S14. At step S11, control allotted rate Rxg is determined based on the host vehicle's yaw angle $\phi$. At step S12, desired deceleration rate Xgs is calculated based on proportional gain Kxg, which is determined based on control allotted rate Rxg, from the expression $Xgs=-Kxg \times (XS-X_C)$. At step S13, desired yaw moment Ms is calculated based on proportional gain Km, which is determined based on control allotted rate Rxg, from the expression $Ms=-Km \times K1 \times K2 \times (XS-X_C)$. Thereafter, in such a manner as to achieve both of desired deceleration rate Xgs to be generated by vehicle deceleration control and desired yaw moment Ms to be generated by yaw moment control, desired wheel-brake cylinder pressures Psi are calculated. At the same time, desired driving torque TrqDS is calculated, based on the function f(Acc) based on accelerator opening Acc and the function g(Ps) based on the sum Ps ($=\Delta Ps_F+\Delta Ps_R+Pmcnt$) of front and rear desired wheel-brake cylinder pressure differences $\Delta Ps_F$ and $\Delta Ps_R$ and equivalent controlled master-cylinder pressure Pmcnt determined based on desired deceleration rate Xgs needed for vehicle deceleration control, from the expression TrqDS=f(Acc)−g(Ps). The braking torque and driving torque of each road wheel are controlled suitably to avoid the host vehicle's lane deviation. As a consequence, as clearly shown in FIG. 13, the clockwise yawing moment corresponding to desired yaw moment Ms is exerted on the host vehicle according to the yaw moment control so as to effectively suppress the host vehicle's lane deviation to the left, and at the same time the braking torque corresponding to desired deceleration rate Xgs is applied to the host vehicle according to the vehicle deceleration control. As set forth above, according to the LDP apparatus of the embodiment, as can be seen from the explanatory view of FIG. 13, two control actions, namely yaw moment control producing desired yaw moment Ms and vehicle deceleration control producing desired deceleration rate Xgs, can be performed simultaneously.

Figure 14:
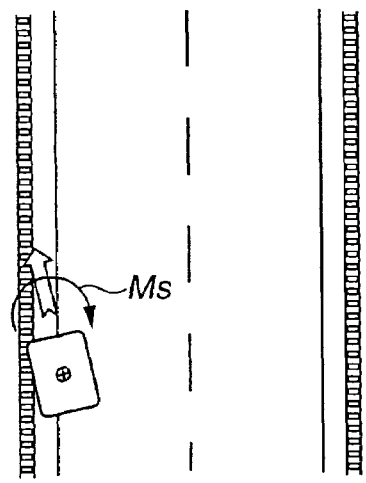
FIG. 14 is a comparative view showing a single control action, that is, only the yaw moment control indicated by the character Ms.

On the other hand, as can be seen from the comparative example of FIG. 14, suppose that lane deviation prevention (LDP) control is achieved by way of only the yaw moment control producing desired yaw moment Ms to suppress or reduce the host vehicle's lane-deviation tendency. As can be appreciated from the driving state of the host vehicle shown in FIG. 14, when the host vehicle has an increased lane-deviation tendency and travels on the road-surface irregularities (the rumble strip) artificially formed on the white lane marker or equidistantly repeatedly formed outside of and close to the white lane marker, predictably, the host vehicle may come into collision with a frontally-located object such as another vehicle or the host vehicle may roll. To avoid this, when the host vehicle has an increased lane-deviation tendency and travels on the road-surface irregularities, it is more desirable or preferable to simultaneously execute vehicle deceleration control as well as yaw moment control, in order to achieve both of yawing moment application (i.e., desired yaw moment Ms) to the host vehicle for lane deviation avoidance and braking torque application (i.e., desired deceleration rate Xgs) to the host vehicle for collision avoidance and vehicle's roll avoidance. Even though the host vehicle's roll occurs or the host vehicle comes into collision with another vehicle, it is possible to effectively reduce undesirable impact and shock. This contributes to enhanced safety. In other words, the LDP apparatus of the embodiment can provide an active safety system (a combined active safety system of the yaw moment control system and the vehicle deceleration control system) as well as a passive warning system.

Additionally, in the LDP apparatus of the embodiment, control allotted rate Rxg is determined or map-retrieved based on the host vehicle's yaw angle φ (see FIG. 10). For instance, when the host vehicle's yaw angle φ is comparatively large, that is, in case of the increased lane-deviation tendency, in other words, when there is a high possibility of a collision or a roll, control allotted rate Rxg can be set to a high rate. Owing to control allotted rate Rxg set to high, proportional gain Kxg needed for calculation of desired deceleration rate Xgs can be set to a high value (see FIG. 11), whereas proportional gain Km needed for calculation of desired yaw moment Ms can be set to a low value (see FIG. 12). As a result of this, the control allotted rate of vehicle deceleration control to yaw moment control can be increased, and thus it is possible to effectively reduce or eliminate undesirable shock and impact of a collision or a roll. Conversely when the host vehicle's yaw angle φ is comparatively small, that is, in case of the less lane-deviation tendency, in other words, when there is a less possibility of a collision or a roll, control allotted rate Rxg can be set to a low rate. Owing control allotted rate Rxg set to low, proportional gain Kxg needed for calculation of desired deceleration rate Xgs can be set to a low value (see FIG. 11), whereas proportional gain Km needed for calculation of desired yaw moment Ms can be set to a high value (see FIG. 12). As a result of this, the control allotted rate of vehicle deceleration control to yaw moment control is decreased, in other words, the control allotted rate of yaw moment control to vehicle deceleration control is increased. Thus, in case of the relatively small yaw angle, a higher priority is put on yaw moment control rather than vehicle deceleration control, to preferentially rapidly reduce or suppress the host vehicle's lane-deviation tendency by way of the highly control-allotted yaw moment control. As discussed above, by virtue of the properly tuned or programmed characteristic maps of FIGS. 10-12, in order to assure a higher effect of control action, a higher priority can be put on a preferable one of two control actions, namely yaw moment control and vehicle deceleration control, depending on the host vehicle's driving state including at least yaw angle φ. That is to say, it is possible to more effectively, suitably, and accurately control the applied yawing moment (≈Ms) and applied deceleration rate (≈Xgs) depending on the host vehicle's driving state, thereby enhancing the total effect of the two control actions, namely yaw moment control and vehicle deceleration control.

If direction indicator switch 20 has been manually turned ON under the condition of $F_{LD}$=1 or Fdw=1, lane-changing indicative flag $F_{LC}$ is set to "1". Thus, lane-deviation decision flag $F_{LD}$ and road-edge decision flag Fdw can be forcibly reset to "0". In this manner, in presence of the driver's intention for lane changing, that is, when $F_{LC}$=1, the LDP control function is not engaged, in other words, yaw moment control and vehicle deceleration control are both inhibited.

Thereafter, as a result of vehicle deceleration control as well as yaw moment control, suppose that there is a transition from the state where front-left road wheel 5FL of the host vehicle travels on the rumble strip to the state where the host vehicle travels within the left and right white lane markers of the driving lane. At the next execution cycle of the LDP control routine of FIG. 2, the flow from step S9 to step S11 is changed to the flow from step S9 to step S10, and thus only the desired yaw moment Ms is calculated, while desired deceleration rate Xgs is kept to "0". Therefore, LDP control is achieved by way of only the yaw moment control without vehicle deceleration control. That is to say, when the driving state of the host vehicle is recovering from the increased lane-deviation tendency to the less lane-deviation tendency, only the yaw moment control is permitted, while vehicle deceleration control is inhibited. Inhibiting vehicle deceleration control and permitting yaw moment control contributes to advanced or promoted recovery to the less lane-deviation tendency. As discussed above, according to the LDP apparatus of the embodiment, it is possible to effectively provide a more suitable control action depending on the host vehicle's driving state.

As described previously, the LDP apparatus of the embodiment can forcibly, actively execute vehicle deceleration control and yaw moment control both properly control-allotted, when there is a host vehicle's lane-deviation tendency, thus effectively actively suppressing the host vehicle's lane-deviation tendency and effectively reducing or eliminating undesirable shock and impact of a collision (or a vehicle roll) after the host vehicle has deviated from its driving lane. Additionally, the LDP apparatus of the embodiment is able to check for the host vehicle traveling on the road-surface irregularities, such as rumble strips, artificially formed on the white lane marker or equidistantly repeatedly formed outside of and close to the white lane marker. Thus, it is possible to more certainly reliably determine whether the host vehicle tends to deviate from its driving lane even in extreme weather situations, thus timely certainly initiating the lane deviation prevention (LDP) function or the lane deviation avoidance (LDA) function. During execution of LDP control, that is, when the LDP control is operative ($F_{LD}$≠0), the LDP apparatus of the embodiment can perform LDP control, while avoiding undesirable interference between the host vehicle's decelerating action based on LDP control and the host vehicle's decelerating action based on the driver's brake-pedal depression and also avoiding undesirable interference between the host vehicle's accelerating action based on LDP control and the host vehicle's accelerating action based on the driver's accelerator-pedal depression (see step S14). Thus, it is possible to realize the host vehicle's dynamic behavior suitable for the driver's wishes even during execution of LDP control.

In addition to the above, the LDP apparatus of the embodiment is designed to detect, based on the wheel-speed indicative sensor signal from each of wheel-speed sensors 22i, whether or not the host vehicle is traveling on the road-surface irregularities. On ABS system equipped automotive vehicles or TCS system equipped vehicles or VDC system equipped vehicles, wheel speed sensors are usually installed for detecting or estimating deceleration slip or acceleration slip or vehicle speed. Thus, the LDP apparatus of the embodiment can utilize sensor signals from the existing wheel speed sensors. This eliminates the necessity of additional sensors for detection of the road-surface irregularities, thus downsizing the LDP control system and also reducing total manufacturing costs of the LDP apparatus.

Furthermore, only when the periodical wheel-speed fluctuation (or periodical wheel-acceleration fluctuation) is occurring, the LDP apparatus of the embodiment determines that the host vehicle is traveling on the road edge or either one of the leftmost and rightmost edges of the driving lane, and maintains road-surface irregularities decision flag Foti (or road-edge decision flag Fdw) at the flag set state. In this manner, only when the periodical wheel-speed fluctuation is occurring, the LDP apparatus continuously executes vehicle deceleration control as well as yaw moment control. However, there is a specific situation where the vehicle deceleration control has to be further continued, even after a state transition from the presence of periodical wheel-speed fluctuation to the absence of periodical wheel-speed fluctuation has occurred. For instance, suppose that the front-left road wheel 5FL of the host vehicle begins to travel on the rumble strip and then the host vehicle's traveling state on the rumble strip terminates and thereafter the host vehicle begins to travel within left and right white lane markers of the adjacent driving lane. In such a case, a host vehicle's lateral displacement obtained when the host vehicle's traveling state on the rumble strip terminates is greater than a host vehicle's lateral displacement obtained when the LDP control system initiates vehicle deceleration control. Under this condition, the processor of ECU 8 determines that the host vehicle is continuously deviating after passing across the road-surface irregularities. In such a specific situation, in order to maintain the vehicle deceleration control mode, preferably, the LDP apparatus may hold road-surface irregularities decision flag Foti (or road-edge decision flag Fdw) at the flag set state for a predetermined time duration even after the state transition from the presence of periodical wheel-speed fluctuation to the absence of periodical wheel-speed fluctuation has occurred. Alternatively, in the previously-noted specific situation, the LDP apparatus may continuously execute the vehicle deceleration control mode for a predetermined constant time duration from the time when the transition from the presence of periodical wheel-speed fluctuation to the absence of periodical wheel-speed fluctuation has occurred. In lieu thereof, in the specific situation, the LDP apparatus may continuously execute the vehicle deceleration control mode, until the host vehicle's lateral displacement reduces to below a predetermined threshold value.

As set out above, the control actions, performed by the LDP apparatus of the embodiment in presence of the host vehicle's lane-deviation tendency to the left, are explained and exemplified in reference to the explanatory view shown in FIG. 13. In case that the rumble strips are formed on both sides of the driving lane, the control actions of the LDP apparatus of the embodiment are the same in the host vehicle's lane deviations to the left or to the right. On the contrary, in case that the rumble strip is formed on the left-hand side of the driving lane but not formed on the right-hand side, the processor of ECU 8 cannot detect the host vehicle traveling on the right-hand side rumble strip, and therefore road-surface irregularities decision flag Foti (or road-edge decision flag Fdw) is kept at the reset state. As a result, the LDP control is achieved by way of only the yaw moment control.

Figure 15:
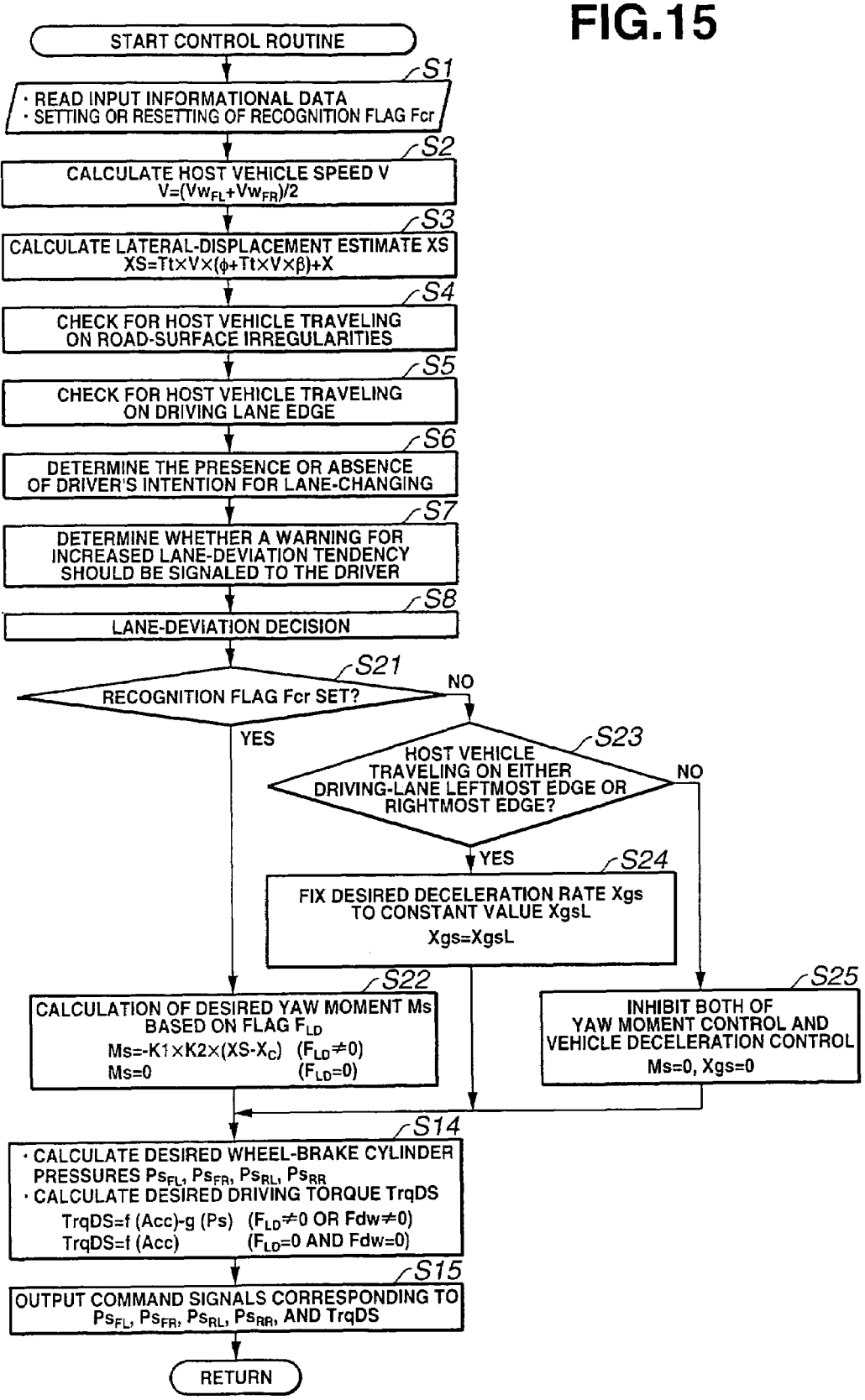
FIG. 15 is a flow chart showing a modified lane deviation prevention control routine executed within the processor incorporated in the LDP apparatus of the embodiment.

Referring now to FIG. 15, there is shown the first modified lane deviation prevention control routine. The modified control routine shown in FIG. 15 is also executed as time-triggered interrupt routines to be triggered every predetermined time intervals such as 20 milliseconds. The modified control routine of FIG. 15 is similar to the arithmetic and logic processing of FIG. 2, except that steps S9–S13 included in the routine shown in FIG. 2 are replaced with steps S21–S25 included in the routine shown in FIG. 15. Thus, the same step numbers used to designate steps in the routine shown in FIG. 2 will be applied to the corresponding step numbers used in the modified routine shown in FIG. 15, for the purpose of comparison of the two different interrupt routines. Steps S21–S25 will be hereinafter described in detail with reference to the accompanying drawings, while detailed description of steps S1–S8, and S14–S15 will be omitted because the above description thereon seems to be self-explanatory.

After the lane-deviation decision has been made based on the picture image data concerning the white lane marker in front of the host vehicle, in other words, a comparison result between lateral-displacement estimate XS and lateral-displacement criterion $X_C$, the routine proceeds from step S8 to step S21.

At step S21, a check is made to determine, based on the signal level of the recognition signal from camera controller 14, whether recognition flag Fcr is set (Fcr=1). When the lane marker (the driving lane) can be properly recognized or detected by CCD camera 13, that is, in the lane-marker recognizable state (Fcr=1), the routine proceeds from step S21 to step S22. Conversely when the lane marker cannot be properly recognized by CCD camera 13 owing to extreme weather situations, that is, in the lane-marker unrecognizable state (Fcr=0), the routine proceeds from step S21 to step S23.

At step S22, in the same manner as step S10 of FIG. 2, desired yaw moment Ms, needed to avoid the host vehicle's lane-deviation tendency by execution of LDP control achieved by way of only the yaw moment control, is arithmetically calculated or derived, depending on the state of lane-deviation decision flag $F_{LD}$. In case of $F_{LD} \neq 0$, that is, when the processor of ECU 8 determines, based on the difference $(XS-X_C)$, that there is an increased tendency for the host vehicle to deviate from the driving lane, desired yaw moment Ms is calculated from the expression $Ms=-K1 \times K2 \times (XS-X_C)$. Conversely when $F_{LD}=0$, desired yaw moment Ms is set to "0" through step S22, that is, Ms=0.

At step S23, a check is made to determine whether road-edge decision flag Fdw, obtained through step S8, is set (Fdw≠0) or reset (Fdw=0). In case of Fdw=0, the routine proceeds from step S23 to step S25. Conversely when Fdw≠0 (i.e., Fdw=+1 or Fdw=−1), the routine proceeds from step S23 to step S24.

At step S24, desired deceleration rate Xgs to be generated by vehicle deceleration control is fixed to a preset constant value XgsL, that is, Xgs=XgsL. This is because, in the lane-marker unrecognizable state (Fcr=0), the latest up-to-date informational data of the host vehicle's lateral displacement X (i.e., the latest up-to-date informational data of lateral-displacement estimate XS) to be extracted at the current execution cycle cannot be computed. Additionally, at step S24, desired yaw moment Ms is set to "0" to inhibit yaw moment control.

At step S25, desired yaw moment Ms is set to "0" and additionally desired deceleration rate Xgs is set to "0" under the specific condition (Fcr=0 plus Fdw=0) where the white lane marker cannot be detected by camera controller 14 due to extreme weather situations and additionally the host vehicle is not traveling on the road edge (either one of leftmost and rightmost edges of the driving lane). After steps S22, S24, or S25, the routine flows via step S14 to step S15.

The automotive LDP apparatus executing the modified LDP control routine shown in FIG. 15 operates as follows.

In the lane-marker recognizable state (Fcr=1) where the lane marker (the driving lane) can be properly recognized by CCD camera 13, when the host vehicle is traveling along the centerline of the driving lane or when the host vehicle tends to deviate from the driving lane, the routine proceeds from step S21 to step S22. At step S22, desired yaw moment Ms is calculated or determined based on the state of lane-deviation decision flag $F_{LD}$ and the current host vehicle's lateral displacement, exactly the difference $(XS-X_C)$ between lateral-displacement estimate XS and predetermined lateral-displacement criterion $X_C$. Therefore, in the lane-marker recognizable state (Fcr=1), it is possible to apply a yawing moment corresponding to the current host vehicle's lateral displacement to the host vehicle to effectively suppress the lane-deviation tendency. In contrast, in the lane-marker unrecognizable state (Fcr=0) where the lane marker (the driving lane) cannot be properly recognized by CCD camera 13, for example, in extreme weather situations, owing to poor visibility, or when a white lane marker is out of an image pick-up enabling area due to a large yaw angle $\phi$ with respect to the sense of the host vehicle's driving lane, the routine proceeds from step S21 to step S23. At this time, suppose that the host vehicle is traveling on the road edge (either one of leftmost and rightmost edges of the driving lane), that is, Fdw≠0 (i.e., Fdw=+1 or Fdw=−1). The routine flows from step S23 to step S24. At step S24, desired deceleration rate Xgs is fixed to preset constant value XgsL so as to execute only the vehicle deceleration control. Therefore, in the lane-marker unrecognizable state (Fcr=0) where the lane marker (the driving lane) cannot be properly recognized by CCD camera 13 and thus the current host vehicle's lateral displacement needed to determine the desired yaw moment cannot be detected, the LDP control system can continuously execute vehicle deceleration control in place of yaw moment control, thus remarkably enhancing the effect of vehicle deceleration control. Thus, in the specific situation where the host vehicle has an increased lane-deviation tendency and travels on the road-surface irregularities (the rumble strip), and thus there is a high possibility of a collision or a roll of the host vehicle, the vehicle-deceleration effect is continued, thereby effectively reducing or eliminating undesirable shock and impact even if a collision or a vehicle roll occurs.

Additionally, according to the LDP apparatus executing the modified routine of FIG. 15, desired deceleration rate Xgs to be generated by vehicle deceleration control is automatically forcibly fixed to preset constant value XgsL. Thus, even when the host vehicle's lateral displacement, in other words, the parameter (XS−$X_C$) needed to determine desired yaw moment Ms corresponding to the controlled variable of yaw moment control and also to determine desired deceleration rate Xgs corresponding to the controlled variable of vehicle deceleration control cannot be obtained, it is possible to reliably provide a proper effect of vehicle deceleration control.

Furthermore, according to the LDP apparatus executing the modified routine of FIG. 15, in the lane-marker unrecognizable state (Fcr=0) where the lane marker cannot be properly recognized by CCD camera 13, and additionally the host vehicle is not traveling on the road edge (Fdw=0), desired yaw moment Ms is set to "0" and desired deceleration rate Xgs is set to "0" (see the flow S21→S23→S24 in FIG. 15). Thus, under the condition where the host vehicle is traveling within left and right lane markers of the driving lane in the lane-marker unrecognizable state (Fcr=0), it is possible to inhibit or avoid both of yaw moment control and vehicle deceleration control from being undesirably initiated.

As can be appreciated from step S21, the LDP apparatus executing the modified routine of FIG. 15 determines, based on the state of recognition flag Fcr, whether yaw moment control should be enabled, vehicle deceleration control should be enabled, or both of yaw moment control and vehicle deceleration control should be disabled (inhibited). Instead of using recognition flag Fcr, the LDP control system may utilize a virtual deviation estimate XSv calculated or estimated based on historical data stored in predetermined memory addresses of the RAM of ECU 8, exactly, the computation results ($\phi$o, Xo, $\beta$o) of the host vehicle's yaw angle, the lateral displacement, and the curvature, all obtained just before the transition (Fcr=1→Fcr=0) from the lane-marker recognizable state (Fcr=1) to the lane-marker unrecognizable state (Fcr=0). The LDP apparatus can determine or estimate a possibility of the host vehicle's lane deviation or a host vehicle's lateral displacement, based on virtual deviation estimate XSv, exactly, a comparison result of virtual deviation estimate XSv and a predetermined lateral-displacement criterion Xcv. Under the condition defined by |XSv|<Xcv, a virtual-deviation-estimate XSv based lane-deviation decision flag $F_{LDv}$ is reset to "0". Under the condition defined by |XSv|≧Xcv, virtual-deviation-estimate XSv based lane-deviation decision flag $F_{LDv}$ is set. In such a case, when ECU 8 determines, based on a comparison result (|XSv|−Xcv) of virtual deviation estimate XSv and predetermined lateral-displacement criterion Xcv, that the host vehicle is in a state ($F_{LDv}$≠0) where there is a high possibility (or an increased tendency) of the host vehicle's lane deviation, and that the host vehicle is traveling on the road edge, that is, Fdw≠0, vehicle deceleration control may be initiated by setting desired deceleration rate Xgs to a preset constant value and then the vehicle deceleration control may be executed for a predetermined time duration (a preset operating time for vehicle deceleration control). The process needed to determine, based on a comparison result (|XSv|−Xcv) of virtual deviation estimate XSv and predetermined lateral-displacement criterion Xcv, that there is a high possibility (or an increased tendency) of the host vehicle's lane deviation, serves as a virtual-deviation-estimate XSv based lane-deviation possibility estimation means.

One method to calculate the previously-noted virtual deviation estimate XSv is hereunder explained in detail.

A check for the lane-marker recognizable state (Fcr=1) or the lane-marker unrecognizable state (Fcr=0) is made based on recognition flag Fcr, calculated at the current execution cycle. When recognition flag Fcr, calculated at the current execution cycle, is set to "1", a count value of a lost counter (or a count-down timer) Lcnt is set to "0". Conversely when recognition flag Fcr, calculated at the current execution cycle, is reset to "0", another check is made to determine whether the current time period corresponds to a time period during which a transition (Fcr=1→Fcr=0) from the lane-marker recognizable state (Fcr=1) to the lane-marker unrecognizable state (Fcr=0) has just occurred. Concretely, this check is made to determine whether recognition flag Fcr, calculated one cycle before, has been set to "1". When recognition flag Fcr, calculated one cycle before, has been set to "1" and additionally recognition flag Fcr, calculated at the current execution cycle, is reset to "0", and thus the transition (Fcr=1→Fcr=0) from the lane-marker recognizable state (Fcr=1) to the lane-marker unrecognizable state (Fcr=0) has just occurred, the count value of lost counter Lcnt is set to an initial value Lcnt0, to initiate the count-down operation of lost counter Lcnt. Initial value Lcnt0 corresponds to a maximum count value. On the contrary, when recognition flag Fcr, calculated one cycle before, has been reset to "0" and additionally recognition flag Fcr, calculated at the current execution cycle, is reset to "0", and thus the transition (Fcr=1→Fcr=0) from the lane-marker recognizable state (Fcr=1) to the lane-marker unrecognizable state (Fcr=0) has not occurred, the count value of lost counter Lcnt is calculated from the expression Lcnt=max(Lcnt-1, 0), where max(Lcnt-1, 0) means a select-HIGH process according to which a higher one of two values, namely Lcnt-1 and 0, is selected as the count value of lost counter Lcnt obtained at the current execution cycle, and Lcnt-1 means a value decremented from the count value of lost counter Lcnt, obtained one cycle before, by "1".

Additionally, in the lane-marker unrecognizable state (Fcr=0), in other words, when recognition flag Fcr, calculated at the current execution cycle, is reset to "0", a further check is made to determine whether an elapsed time $T_{lost}$, measured from the point of time at which the transition (Fcr=1→Fcr=0) from the lane-marker recognizable state (Fcr=1) to the lane-marker unrecognizable state (Fcr=0) has occurred, is sufficiently short (in other words, Lcnt>0). Concretely, this check is made based on a comparison result between the current count value of lost counter Lcnt and a predetermined value "0". More concretely, a check is made to determine whether the current count value of lost counter Lcnt is greater than "0". The inequality Lcnt>0 means that the elapsed time $T_{lost}$, measured from the time point of the transition (Fcr=1→Fcr=0) from the lane-marker recognizable state (Fcr=1) to the lane-marker unrecognizable state (Fcr=0), is still short. When Lcnt≦0, virtual deviation estimate XSv is set to "0". Conversely when Lcnt>0, virtual deviation estimate XSv is calculated based on the computation results ($\phi$o, Xo, $\beta$o) of the host vehicle's yaw angle, the lateral displacement, and the curvature, all obtained just before the transition (Fcr=1→Fcr=0) from the lane-marker recognizable state (Fcr=1) to the lane-marker unrecognizable state (Fcr=0), from the expression XSv=Tt×V×($\phi$o+Tt×V×$\beta$o)+Xv, where Xv means a lateral displacement from a virtual driving-lane center on the assumption that the angle (yaw angle $\phi$) between the sense of the host vehicle's driving lane and the host vehicle's x-axis of the vehicle axis system (x, y, z) is fixed to the yaw angle $\phi$o, obtained just before the transition (Fcr=1→Fcr=0) from Fcr=1 to Fcr=0, and additionally the curvature of the host vehicle's driving lane is fixed to the curvature $\beta$o, obtained just before the transition from Fcr=1 to Fcr=0. The previously-noted lateral displacement Xv is arithmetically calculated based on the elapsed time $T_{lost}$, measured from the point of time at which the transition from Fcr=1 to Fcr=0 has occurred, from the expression Xv=Xo−$T_{lost}$×V×($\phi$o+$T_{lost}$×V×$\beta$o). In other words, lateral displacement Xv corresponds to the summed value of (i) the host vehicle's lateral displacement Xo, obtained just before the transition from Fcr=1 to Fcr=0, and (ii) the estimate of lateral displacement of the host vehicle with respect to the host vehicle's driving-lane center, whose lateral-displacement estimate may increase as the previously-discussed elapsed time $T_{lost}$ increases. As set out above, only when the elapsed time $T_{lost}$, measured from the point of time at which the transition from Fcr=1) to Fcr=0 has occurred, is sufficiently short (that is, Lcnt>0), virtual deviation estimate XSv can be arithmetically calculated based on the computation results ($\phi$o, Xo, $\beta$o) of the host vehicle's yaw angle, lateral displacement, and curvature, all obtained just before the transition from Fcr=1 to Fcr=0, from the expression XSv=Tt×V×($\phi$o+Tt×V×$\beta$o)+Xv.

In the modified routine of FIG. 15, the LDP apparatus utilizes the presence (Fcr=1) or absence (Fcr=0) of the lane-marker recognition. Instead of using recognition flag Fcr, only the check for the host vehicle traveling on either one of leftmost and rightmost edges of the driving lane may be used to initiate and enable or engage the vehicle deceleration control. In such a case, when the processor of ECU 8 determines that the host vehicle is traveling on either one of the leftmost and rightmost edges, that is, Fdw≠0, the LDP control system initiates and enables vehicle deceleration control. Conversely when the processor of ECU 8 determines that the host vehicle is not traveling on either one of the leftmost and rightmost edges, that is, Fdw=0, the LDP control system inhibits or disables vehicle deceleration control. Initiating vehicle deceleration control in the presence of a transition from Fdw=0 to Fdw≠0 and permitting the vehicle deceleration control during the state of Fdw≠0, contributes to reduced or eliminated shock and impact of a collision (or a vehicle roll) after the host vehicle has deviated from its driving lane. Also, there is no necessity of CCD camera 13 and camera controller 14, since the state of recognition flag Fcr is not used to enable or engage vehicle deceleration control. This contributes to reduced manufacturing costs of the LDP control system.

Figure 16:
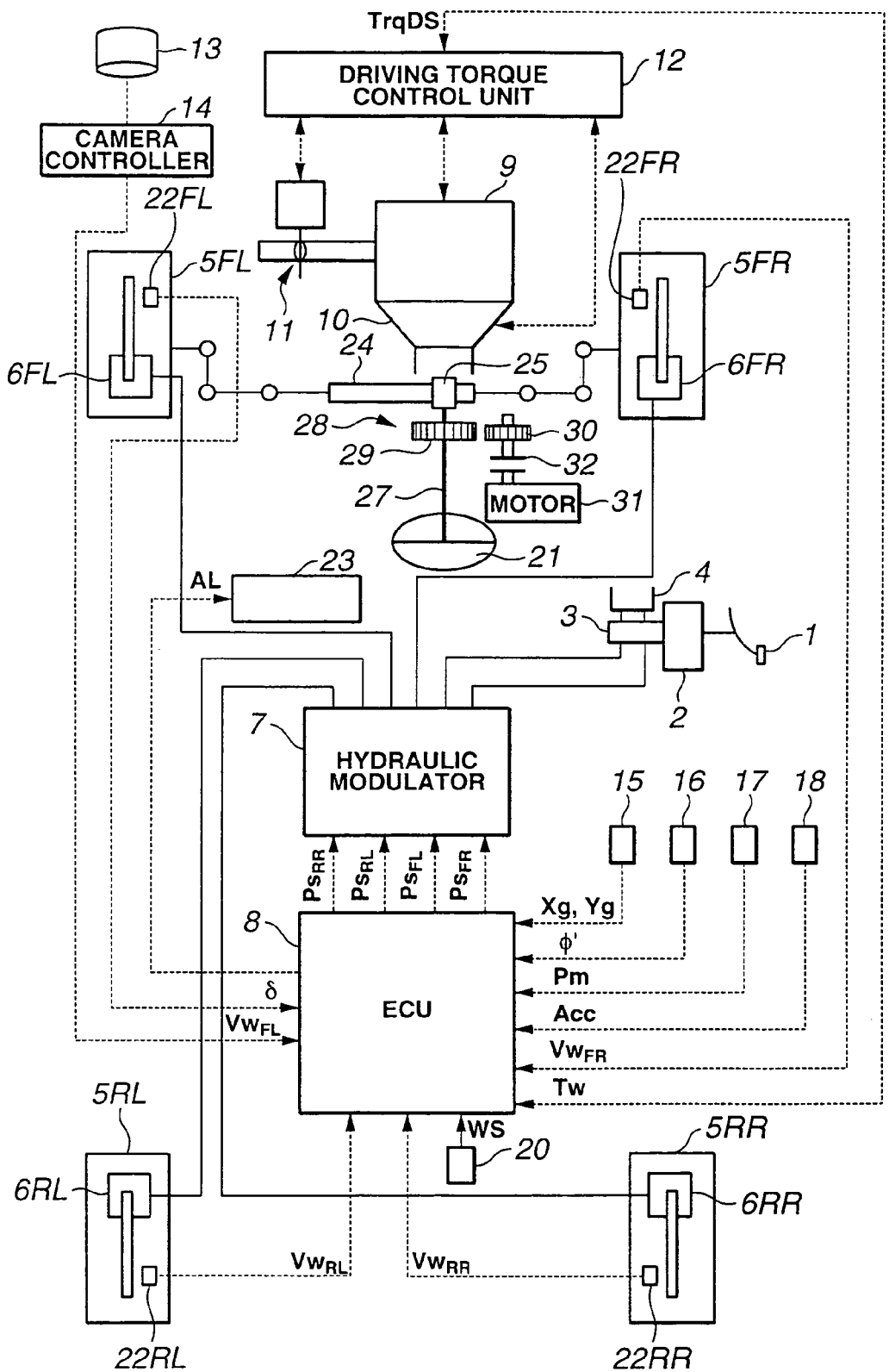
FIG. 16 is a system block diagram illustrating a further modified LDP apparatus employing a steering-actuator equipped LDP control system.

Referring now to FIG. 16, there is shown the modified automotive LDP apparatus employing the steering-actuator equipped LDP control system through which a steering torque is automatically produced in a direction that the host vehicle returns to the central axis (the central position) of the driving lane, for lane deviation avoidance.

As shown in FIG. 16, a conventional rack-and-pinion steering mechanism is provided between front road wheels 5FL and 5FR. The conventional steering mechanism is comprised of at least a rack 24 linked to a steering arm such as a steering knuckle of each front road wheel 5FL (5FR), a pinion 25 in meshed-engagement with rack 24, and a steering shaft 27 through which steering torque is transmitted from steering wheel 21 to pinion gear 25. An auto-steering mechanism or an auto-pilot mechanism 28, which constructs a steering actuator (serving as a vehicle yawing motion control actuator) used for automatic steering action or auto-pilot for the front road wheels, is also provided above the pinion 25. Auto-steering mechanism 28 is comprised of a driven gear 29 coaxially fixedly connected to steering shaft 27, a drive gear 30 in meshed-engagement with driven gear 29, and an auto-steering motor (or an auto-steering control device) 31 that drives drive gear 30. A clutch mechanism 32 is also provided between the motor shaft of auto-steering motor 31 and drive gear 30, for connecting the auto-steering motor shaft to, or disconnecting it from the shaft of drive gear 30. Only during operation of auto-steering mechanism 28, in other words, only during the auto-steering control mode, clutch mechanism 32 is held engaged. During the inoperative state of auto-steering mechanism 28, clutch mechanism 32 is disengaged to prevent input torque created by auto-steering motor 31 from being transmitted to steering shaft 27. When auto-steering motor 31 is driven in response to a command signal from the output interface of ECU 8 during the auto-steering control mode, torque generated by motor 31 is transmitted from clutch mechanism 32 through drive gear 30 and driven gear 29 to steering shaft 27, so that the steering system is automatically controlled in the auto-steering control mode. The steering-actuator equipped LDP control system of the modified automotive LDP apparatus of FIG. 16 is exemplified in a general direct-coupled steering linkage type vehicle steering system using a sole rigid column shaft (steering shaft 27), through which steering wheel 21 is coupled directly to the steering output section linked to steered wheels 5FL and 5FR, and which is rotated by auto-steering motor 31 (auto-steering control means). It will be appreciated that the steering-actuator equipped LDP control system is not limited to such a direct-coupled steering linkage type vehicle steering system using a sole rigid column shaft rotated by auto-steering motor 31. For instance, the sole rigid column shaft 27 may be replaced by primary and secondary column shafts connected by a universal joint. In lieu thereof, the steering-actuator equipped LDP control system may be constructed by a so-called steer-by-wire (SBW) vehicle steering system in which a steering reaction torque applied to a steering wheel and a steer angle at steered road wheels 5FL and 5FR can be arbitrarily determined.

Figure 17:
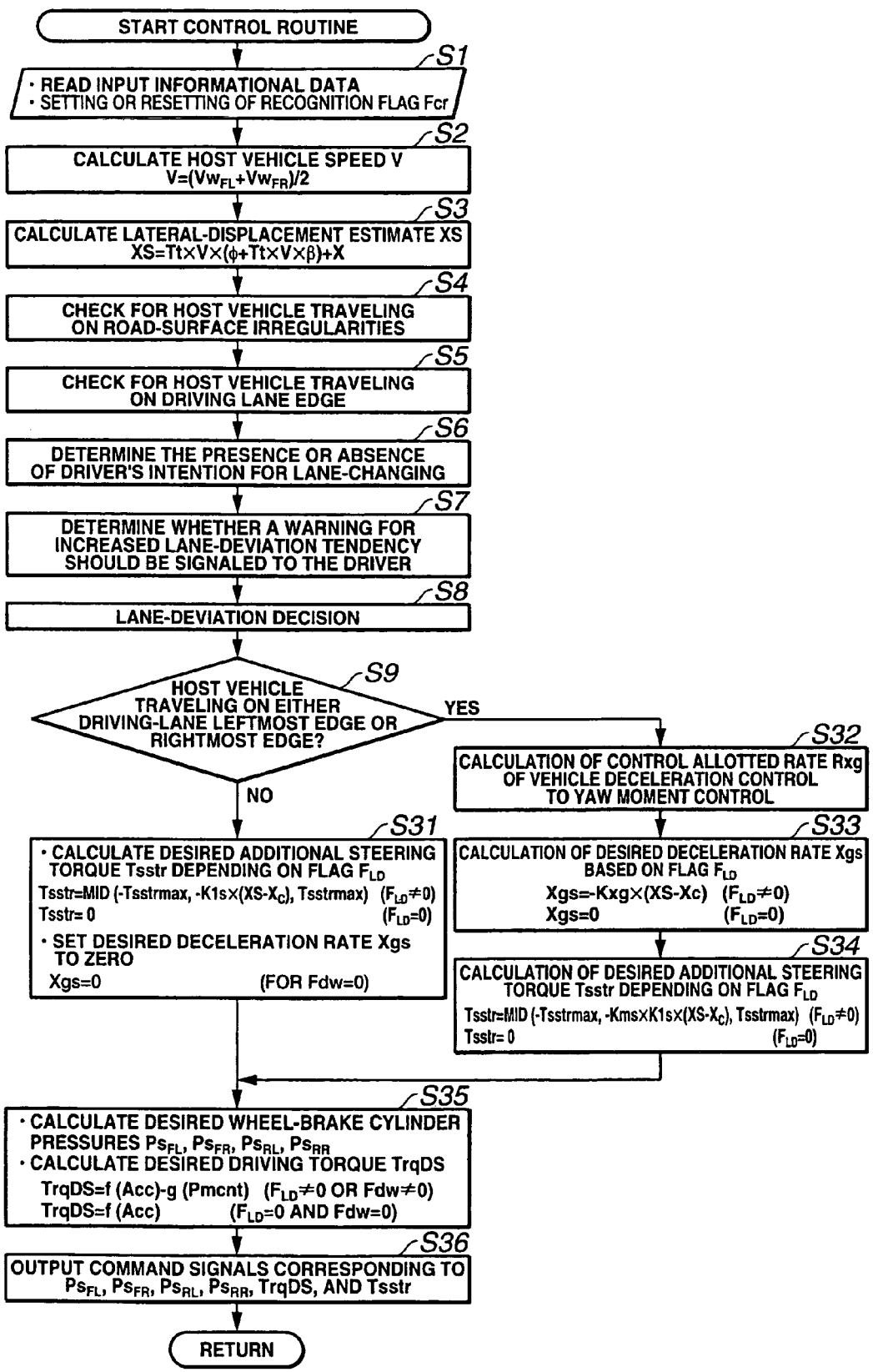
FIG. 17 is a flow chart showing a control routine (arithmetic and logic operations) executed within the processor incorporated in the modified LDP apparatus shown in FIG. 16.

The LDP control routine executed by ECU 8 incorporated in the steering-actuator equipped automotive LDP apparatus shown in FIG. 16 is hereunder described in detail in reference to the flow chart shown in FIG. 17. The LDP control routine of FIG. 17 is also executed as time-triggered interrupt routines to be triggered every predetermined sampling time intervals ΔT such as 20 milliseconds. Briefly speaking, the LDP control routine of FIG. 17 is different from that of FIG. 2, in that in the system executing the routine of FIG. 17, instead of controlling braking forces applied to respective road wheels, a desired additional steering torque Tsstr (described later and different from a steering torque manually acting on the steering wheel by the driver) is used for yaw moment control. The routine of FIG. 17 is similar to that of FIG. 2, except that steps S10-S15 included in the routine shown in FIG. 2 are replaced by steps S31-S36 included in the routine shown in FIG. 17. Thus, the same step numbers used to designate steps in the routine shown in FIG. 2 will be applied to the corresponding step numbers used in the routine shown in FIG. 17, for the purpose of comparison of the two different interrupt routines shown in FIGS. 2 and 17. Steps S31-S36 will be hereinafter described in detail with reference to the accompanying drawings, while detailed description of steps S1-S9 will be omitted because the above description thereon seems to be self-explanatory.

When the answer to step S9 is in affirmative (YES), that is, road-edge decision flag Fdw is set (Fdw≠0), the routine proceeds from step S9 to step S32. Conversely when the answer to step S9 is negative (NO), that is, road-edge decision flag Fdw is reset (Fdw=0), the routine proceeds from step S9 to step S31.

At step S31, a desired additional steering torque Tsstr, needed to avoid the host vehicle's lane-deviation tendency by execution of LDP control achieved by way of only the yaw moment control (only the steering-actuator equipped LDP control system), is arithmetically calculated or derived, depending on the state of lane-deviation decision flag $F_{LD}$. Only when the condition defined by $F_{LD}$≠0 ($F_{LD}$=+1 or $F_{LD}$=−1) is satisfied, in other words, the processor of ECU 8 determines that it is necessary to generate a yawing moment by way of yaw moment control of the steering-actuator equipped LDP control system, desired additional steering torque Tsstr is arithmetically calculated from the following expression (13), corresponding to a so-called select-MID process according to which a middle value of three values, that is, −Tsstrmax, −K1s×(XS−$X_C$), and Tsstrmax is selected as the current value of desired additional steering torque Tsstr.

$$Tsstr=\text{mid}(-Tsstr\text{max},-K1s\times(XS-X_C),Tsstr\text{max}) \quad (13)$$

where Tsstrmax denotes an upper limit of the desired additional steering torque, −Tsstrmax denotes a lower limit of the desired additional steering torque, K1s denotes a constant that is determined by specifications of the host vehicle, and (XS−$X_C$) denotes the difference between lateral-displacement estimate XS and predetermined lateral-displacement criterion $X_C$. In the presence of the flow from step S9 to step S31, road-edge decision flag Fdw is in the reset state (Fdw=0), and thus desired deceleration rate Xgs is set to "0", that is, Xgs=0, since there is no need for vehicle deceleration control under the condition of Fdw=0.

As discussed above, in the LDP apparatus capable of executing the routine of FIG. 17, desired additional steering torque Tsstr is calculated or determined as a controlled variable for feedback control (LDP control). Instead of using the closed-loop feedback control for the additional steering torque, desired additional steering torque Tsstr may be estimated and determined such that a desired lateral displacement and a desired sideslip angle of the host vehicle are achieved by way of a vehicle model such as a two-wheel model, in other words, by way of an observer function. After step S31, the routine proceeds to step S35.

Conversely when Fdw≠0, at step S32, control allotted rate Rxg of vehicle deceleration control to yaw moment control is calculated and determined based on the host vehicle's yaw angle ϕ. Concretely, control allotted rate Rxg is computed or map-retrieved from the predetermined yaw angle ϕ versus control allotted rate Rxg characteristic map shown in FIG. 10. After step S32, step S33 occurs.

At step S33, desired deceleration rate Xgs to be generated by vehicle deceleration control is determined depending on the state of lane-deviation decision flag $F_{LD}$. In case of $F_{LD}$≠0, that is, $F_{LD}$=+1 or $F_{LD}$=−1, desired deceleration rate Xgs is arithmetically calculated based on the difference (XS−$X_C$) between lateral-displacement estimate XS and predetermined lateral-displacement criterion $X_C$ from the expression Xgs=−Kxg×(XS−$X_C$). Conversely when $F_{LD}$=0, desired deceleration rate Xgs is set to "0" through step S33, that is, Xgs=0.

Figure 18:
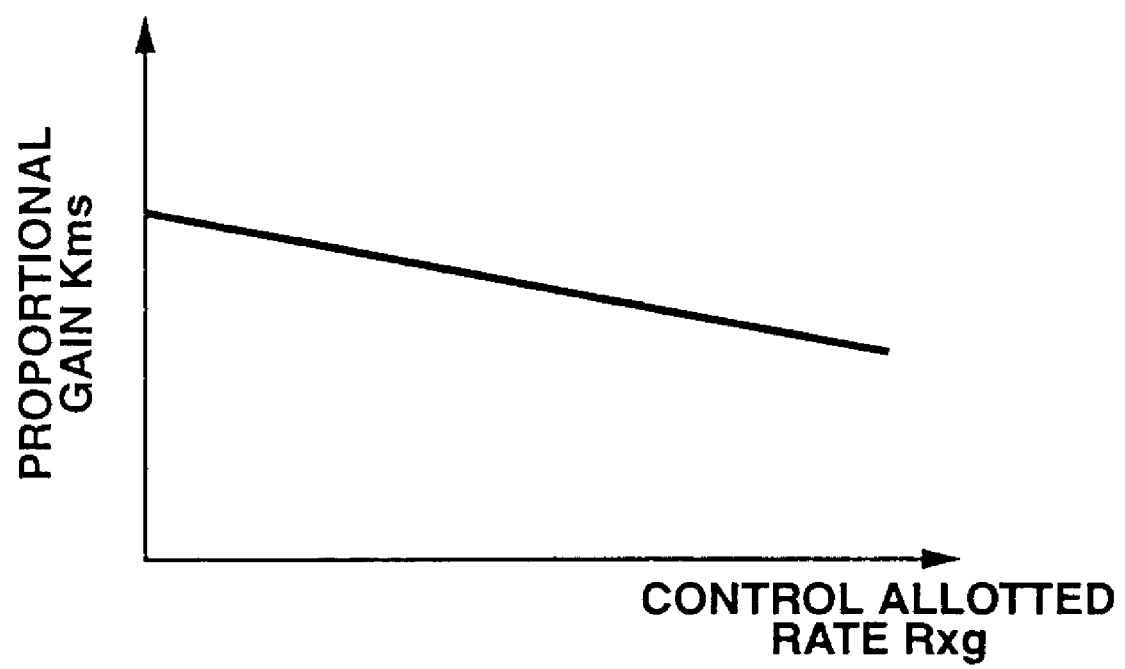
FIG. 18 is a predetermined control allotted rate Rxg versus proportional gain Kms characteristic map used for the LDP control routine of FIG. 17.

At step S34, desired additional steering torque Tsstr, to be applied to the steering system of the host vehicle by way of yaw moment control based on auto-steering action and executed in parallel with vehicle deceleration control, is arithmetically calculated, depending on the state of lane-deviation decision flag $F_{LD}$. In case of $F_{LD}$≠0, that is, when the processor of ECU 8 determines, based on the difference (XS−$X_C$) between lateral-displacement estimate XS and predetermined lateral-displacement criterion $X_C$, that there is an increased tendency for the host vehicle to deviate from the driving lane, desired additional steering torque Tsstr is arithmetically calculated from the following expression (14).

$$Tsstr=\text{mid}(-Tsstr\text{max},-\text{Kms}\times K1s\times(XS-X_C),Tsstr\text{max}) \quad (14)$$

where Tsstrmax denotes an upper limit of the desired additional steering torque, −Tsstrmax denotes a lower limit of the desired additional steering torque, K1s denotes a constant that is determined by specifications of the host vehicle, Kms denotes a proportional gain that is retrieved based on the latest up-to-date informational data of control allotted rate Rxg (set through step S32) from the predetermined control allotted rate Rxg versus proportional gain Kms characteristic map of FIG. 18 showing how a proportional gain Kms has to be varied relative to a control allotted rate Rxg, and (XS−$X_C$) denotes the difference between lateral-displacement estimate XS and predetermined lateral-displacement criterion $X_C$. In the shown embodiment, as can be seen from the preprogrammed Rxg-Kms characteristic map of FIG. 18, proportional gain Kms is set as a monotone function that proportional gain Kms decreases in a linear fashion, as control allotted rate Rxg increases. Conversely when $F_{LD}$=0, desired additional steering torque Tsstr is set to "0" through step S34, that is, Tsstr=0. After steps S31 or S34, step S35 occurs.

At step S35, desired braking forces for the individual road wheels, that is, front-left, front-right, rear-left, and rear-right desired wheel-brake cylinder pressures $Ps_{FL}$, $Ps_{FR}$, $Ps_{RL}$ and $Ps_{RR}$, are calculated based on master cylinder pressure Pm read through step S1, desired additional steering torque Tsstr determined through steps S31 or S34, and desired deceleration rate Xgs determined through step S33. Suppose that brake pedal is depressed by the driver's foot and thus the brakes are applied during the automatic vehicle deceleration control. There is a possibility of undesirable interference between the host vehicle's decelerating action based on vehicle deceleration control executed during the LDP control mode and the host vehicle's decelerating action based on the driver's brake-pedal depression. To avoid such undesirable interference, the following select-HIGH process is performed as follows.

First, equivalent controlled master-cylinder pressure Pmcnt is calculated based on desired deceleration rate Xgs from the previously-discussed expression (7), that is, Pmcnt=Kmxg×Xgs.

Second, selected master-cylinder pressure Pmsel is calculated from the previously-discussed expression, that is, Pmsel=max{Pmcnt, Pm}.

Third, desired wheel-brake cylinder pressures Psi are calculated irrespective of the state of lane-deviation decision flag $F_{LD}$ and the state of road-edge decision flag Fdw, from the following expressions.

$$Ps_{FL}=Ps_{FR}=Pmsel$$

$$Ps_{RL}=Ps_{RR}=PmR$$

Simultaneously, at step S35, desired driving torque TrqDS is arithmetically calculated as detailed hereunder.

Under the specified condition defined by $F_{LD}\neq 0$ (i.e., $F_{LD}=+1$ or $F_{LD}=-1$) or Fdw≠0 (i.e., Fdw=+1 or Fdw=-1), that is, when the LDP control system is in operation, vehicle acceleration is reduced or suppressed by decreasingly compensating for the engine output even when the accelerator pedal is depressed by the driver. Concretely, in case of $F_{LD}\neq 0$ or Fdw≠0, desired driving torque TrqDS is calculated from the following expression.

$$TrqDS=f(Acc)-g(Pmcnt)$$

where f(Acc) is a function of accelerator opening Acc read through step S1 and the function f(Acc) is provided to calculate a desired driving torque that is determined based on the accelerator opening Acc and required to accelerate the host vehicle, and g(Pmcnt) is a function of equivalent controlled master-cylinder pressure Pmcnt and provided to calculate a desired braking torque based on equivalent controlled master-cylinder pressure Pmcnt.

Therefore, when the condition defined by $F_{LD}\neq 0$ (that is, $F_{LD}=+1$ or -1) or Fdw≠0 (that is, Fdw=1 or -1) is satisfied, and thus the LDP control is executed, the engine torque output is reduced by the braking torque created based on equivalent controlled master-cylinder pressure Pmcnt.

On the contrary, when the condition defined by $F_{LD}=0$ and Fdw=0 is satisfied, desired driving torque TrqDS is determined based on only the driving torque component needed to accelerate the host vehicle, from the expression TrqDS=f(Acc).

At step S36, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through step S35, are output from the input interface of ECU 8 to hydraulic modulator 7, and simultaneously a command signal corresponding to desired driving torque TrqDS, calculated through the same step S35, is output from the output interface of ECU 8 to driving torque control unit 12. At the same time, a command signal corresponding to desired additional steering torque Tsstr, calculated through steps S31 or S34, is output from the output interface of ECU 8 to auto-steering motor 31. In this manner, one cycle of the time-triggered interrupt routine of FIG. 17 terminates and the predetermined main program is returned.

The automotive LDP apparatus executing the modified LDP control routine shown in FIG. 17 operates as follows.

Suppose that the host vehicle tends to deviate from the current driving lane with no driver's intention for lane-changing and then the absolute value |XS| of lateral-displacement estimate XS becomes greater than or equal to lateral-displacement criterion $X_C$. Owing to the condition of $|XS| \geq X_C$, the processor of ECU 8 determines that there is an increased tendency for the host vehicle to deviate from the current driving lane, and thus a lane-deviation decision flag $F_{LD}$ is set ($F_{LD}\neq 0$). Under this condition, when wheel speed Vwi is fluctuating or oscillating periodically and thus the processor of ECU 8 determines that the host vehicle is traveling on the road-surface irregularities, road-edge decision flag Fdw is set (Fdw≠0). Conversely when there is no periodical fluctuation in wheel speed Vwi and thus the processor of ECU 8 determines that the host vehicle is not traveling on the road-surface irregularities, road-edge decision flag Fdw is reset (Fdw=0). Under the state of $F_{LD}\neq 0$ and Fdw=0, the routine of FIG. 17 flows from step S9 via step S31 to step S35. Thus, when there is a host vehicle's lane-deviation tendency but the host vehicle is not traveling on the road-surface irregularities, desired additional steering torque Tsstr is calculated based on the difference $(XS-X_C)$ between lateral-displacement estimate XS and predetermined lateral-displacement criterion $X_C$, from the expression $Tsstr=-K1s\times(XS-X_C)$. For the purpose of only the yaw moment control, the LDP apparatus controls the steering system by means of auto-steering motor 31 in such a manner as to bring the actual additional steering torque closer to desired additional steering torque Tsstr. As a result, the yawing moment corresponding to desired additional steering torque Tsstr can be exerted on the host vehicle to effectively reduce or suppress the host vehicle's lane-deviation tendency. Under the state of $F_{LD}\neq 0$ and Fdw≠0, the routine of FIG. 17 flows from step S9 via steps S32-S34 to step S35. Thus, when there is a host vehicle's lane-deviation tendency and additionally the host vehicle is traveling on the road-surface irregularities, desired deceleration rate Xgs is calculated based on control allotted rate Rxg (based on the host vehicle's yaw angle φ), from the expression $Xgs=-Kxg\times(XS-X_C)$, where Kxg is determined based on Rxg. At the same time, desired additional steering torque Tsstr is calculated based on the same control allotted rate Rxg, from the expression $Tsstr=-Kms\times K1s\times(XS-X_C)$, where Kms is determined based on Rxg. For the purpose of vehicle deceleration control as well as yaw moment control, the LDP apparatus controls all of the applied steering torque (the applied yawing moment) and the applied driving/braking torque, in such a manner as to bring the actual additional steering torque closer to desired additional steering torque Tsstr, and decreasingly compensate for the driving torque (see the expression TrqDS=f(Acc)-g(Pmcnt) in step S35), and bring the actual vehicle deceleration rate closer to desired deceleration rate Xgs. As a result, the yawing moment corresponding to desired additional steering torque Tsstr can be exerted on the host vehicle to effectively reduce or suppress the host vehicle's lane-deviation tendency, and at the same time the proper vehicle deceleration corresponding to desired deceleration rate Xgs can be created to effectively reduce or eliminate undesirable shock and impact even if a collision or a vehicle roll occurs after the host vehicle has deviated from the driving lane.

As set forth above, the LDP apparatus of FIGS. 16-18, employing the steering-actuator equipped LDP control system can provide almost the same effects as the embodiment of FIGS. 1-2, 6-7, and 9-12. Additionally, in LDP apparatus of FIGS. 16-18, the command signal corresponding to desired additional steering torque Tsstr, calculated through steps S31 or S34, is output to auto-steering motor 31, and as a result the automatically-controlled steer angle δ is produced in a direction that the host vehicle returns to the central axis of the current driving lane. Therefore, in the steering-actuator equipped LDP apparatus of FIGS. 16-18, auto-steering mechanism 28, serving as a steering actuator, is used to exert a yawing moment on the host vehicle instead of using hydraulic modulator 7, and thus it is possible to generate a desired yawing moment without decelerating the host vehicle and without giving a feeling of uncomfortable vehicle deceleration to the driver.

As discussed above, the LDP apparatus of FIGS. 16-18 is somewhat modified from the LDP apparatus of the embodiment of FIGS. 1-2, 6-7, and 9-12, such that a yaw-moment generating unit (yaw-moment generating means) for exerting a yawing moment on the host vehicle is modified from hydraulic modulator 7 to auto-steering mechanism 28. In the same manner, the LDP apparatus executing the LDP control routine of FIG. 15 may be further modified, such that a yaw-moment generating unit (yaw-moment generating means) for exerting a yawing moment on the host vehicle is modified from hydraulic modulator 7 to auto-steering mechanism 28.

In the automotive LDP apparatus of the shown embodiments, capable of executing the respective routines shown in FIGS. 2, 15 and 17, the process of step S4 and wheel speed sensors 22FL-22RR serve as a road-surface irregularities detector (road-surface irregularities detection means). The process of each of step S12 shown in FIG. 2, step S24 shown in FIG. 15, and step S33 shown in FIG. 17 serves as a vehicle deceleration control section (vehicle deceleration control means). Wheel speed sensors 22FL-22RR shown in FIGS. 1 and 16 serve as a wheel-speed detection means. CCD camera 13 shown in FIGS. 1 and 16 serves as a picture image pick-up device (picture image pick-up means). Camera controller 14 shown in FIGS. 1 and 16 serves as a lane marker detector (lane marker detection means). The process of step S8 shown in FIGS. 2, 15 and 17, through which lane-deviation decision flag $F_{LD}$ is set or reset depending on the difference ($XS-X_C$) between lateral-displacement estimate XS and lateral-displacement criterion $X_C$, serves as a lane-deviation tendency detector (lane-deviation tendency detection means). Steps S10 and S13-S15 shown in FIG. 2, or steps S22 and S14-S15 shown in FIG. 15, or steps S31 and S34-S36 shown in FIG. 17 serve as a lane deviation prevention (LDP) control means. The process of each of step S11 of FIG. 2 and step S32 of FIG. 17 serves as a control allotted rate decision means. Engine/vehicle switches and sensors (containing G sensor 15 and yaw rate sensor 16 detecting yaw rate φ', and the like) and camera controller 14 computing yaw angle φ, lateral displacement X, and curvature β, serve as a vehicle's driving state and traveling-path condition detection means. The process of steps S1 and S21 shown in FIG. 15 serves as a lane-marker recognizable(Fcr=1)/unrecognizable(Fcr=0) state detection means. The process of steps S14-S15 shown in FIGS. 2 and 15 or the process of steps S35-S36 shown in FIG. 17 serves as a braking/driving force controlled variable calculation means. Hydraulic modulator 7 and driving torque control unit 12 serve as a braking/driving force control means. Auto-steering mechanism 28 and auto-steering control device 31 serves as a steering control means.

In the shown embodiments shown herein, a check for such a state that either one of road wheels of the host vehicle is traveling on road-surface irregularities formed on the white lane marker (the white lane line) or formed outside of and close to the white lane marker, is based on wheel speed Vwi of each road wheel (exactly, comparison results of each wheel acceleration dVwi and its threshold value $S_{limt}$). In lieu thereof, such a check may be based on a vertical acceleration of a point of the vehicle suspension, moving up and down or a suspension stroke. In this case, sensor signals from an acceleration sensor (a suspension vertical acceleration sensor or G sensor 15 as shown in FIGS. 1 and 16) and/or a stroke sensor commonly used for active suspension control of active suspension system equipped vehicles can also be used for the LDP control system. The use of an acceleration sensor and/or a stroke sensor common to active suspension control and LDP control, as a whole, contributes to an inexpensive combined system of active suspension control and LDP control.

Furthermore, when the external recognizing sensor (also serving as a vehicle-path detector) containing the navigation system and/or CCD camera 13 detects that the host vehicle is traveling within a car parking area except road-ways, a check for the host vehicle traveling on road-surface irregularities formed on the white lane marker, may be inhibited to enhance the accuracy of road-surface irregularities detection executed through step S4.

In the shown embodiments, road-surface irregularities decision flag $Fot_{FL}$ (or $Fot_{FR}$) is set, when front-left road wheel 5FL (or front-right road wheel 5FR) is traveling on the road-surface irregularities equidistantly repeatedly formed on the white lane marker by forming the ridged portions (see FIG. 5A) on the lane marker. In lieu thereof, road-surface irregularities decision flag $Fot_{FL}$ (or $Fot_{FR}$) may be set, when front-left road wheel 5FL (or front-right road wheel 5FR) is traveling on the road-surface irregularities equidistantly repeatedly formed on the white lane marker by forming recessed portions on the lane marker.

In the shown embodiments, a check for such a state that either one of road wheels of the host vehicle is traveling on road-surface irregularities, formed on the white lane marker, in other words, setting of road-edge decision flag Fdw to "+1" (or to "−1"), is based on front-left and front-right wheel speeds $Vw_{FL}$ and $Vw_{FR}$, exactly, comparison results of front-left wheel acceleration $dVw_{FL}$ and its threshold value $S_{limt}$ and front-right wheel acceleration $dVw_{FR}$ and its threshold value $S_{limt}$. In lieu thereof, setting of road-edge decision flag Fdw may be based on rear-left and rear-right wheel speeds $Vw_{RL}$ and $Vw_{RR}$, exactly, comparison results of rear-left wheel acceleration $dVw_{RL}$ and its threshold value $S_{limtR}$ and rear-right wheel acceleration $dVw_{RR}$ and its threshold value $S_{limt}R$. That is to say, when the processor of ECU 8 determines that either one of four road wheels of the host vehicle is traveling on road-surface irregularities, road-edge decision flag Fdw may be set.

The entire contents of Japanese Patent Application No. 2003-404632 (filed Dec. 3, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive lane deviation prevention (LDP) apparatus comprising:
   a road-surface irregularities detector configured to detect whether a host vehicle is in a state where the host vehicle is traveling on road-surface irregularities formed on or close to a lane marking line and arranged along the lane marking line;
   a picture image pick-up device configured to pick up a picture image in front of the host vehicle;
   a lane marker detector configured to detect a lane marking line of a driving lane of the host vehicle, based on the picture image picked up by the picture image pick-up device;
   an actuator configured to decelerate the host vehicle; and
   a control unit configured to be electronically connected to the road-surface irregularities detector, the lane marker detector, and the actuator for LDP control purposes;

the control unit comprising:
  an LDP control section configured to execute, based on the detected lane marking line, yaw moment control by which a host vehicle's lane deviation tendency is avoided, when the lane marking line can be detected by the lane marker detector; and
  a vehicle deceleration control section configured to execute vehicle deceleration control to actively decelerate the host vehicle, when all following conditions occur:
    (1) when the host vehicle is traveling on the road-surface irregularities formed on or close to the lane marking line and arranged along the lane marking line; and
    (2) while the lane marking line cannot be detected by the lane marker detector.

2. The LDP apparatus as claimed in claim 1, wherein:
the road-surface irregularities detector comprises wheel speed sensors that detect respective wheel speeds of road wheels of the host vehicle; and
the road-surface irregularities detector is configured to determine, based on the wheel speeds, whether the host vehicle is in the state where the host vehicle is traveling on the road-surface irregularities.

3. The LDP apparatus as claimed in claim 2, wherein:
the road-surface irregularities detector is configured to determine that the host vehicle is in the state where the host vehicle is traveling on the road-surface irregularities when either one of the left and right wheel speeds is fluctuating.

4. The LDP apparatus as claimed in claim 2, wherein:
the road-surface irregularities detector is configured to determine that the host vehicle is in the state where the host vehicle is traveling on the road-surface irregularities when the wheel speed is fluctuating at a substantially constant time period determined based on a host vehicle speed.

5. The LDP apparatus as claimed in claim 2, further comprising:
  a host vehicle's position information detector configured to detect position information regarding a position of the host vehicle on a map,
  wherein the road-surface irregularities detector is configured to determine, based on the host vehicle's position information and the wheel speeds, that the host vehicle is in the state where the host vehicle is traveling on the road-surface irregularities, when the wheel speed of the host vehicle, traveling on a driving lane, is fluctuating.

6. The LDP apparatus as claimed in claim 1, further comprising:
  a vehicle-suspension up-and-down motion sensor configured to detect an up-and-down motion of a suspension of the host vehicle,
  wherein the road-surface irregularities detector is configured to determine, based on the suspension's up-and-down motion detected, whether the host vehicle is in the state where the host vehicle is traveling on the road-surface irregularities.

7. The LDP apparatus as claimed in claim 1, further comprising:
  a lane-deviation tendency detection section that determines, based on a host vehicle's lateral deviation estimated based on the detected lane marking line, whether the host vehicle is in a state where there is an increased tendency for the host vehicle to deviate from the driving lane or in a state where there is a less tendency for the host vehicle to deviate from the driving lane;
  wherein the LDP control section executes the yaw moment control when the host vehicle is in the state where there is an increased tendency for the host vehicle to deviate from the driving lane.

8. The LDP apparatus as claimed in claim 7, wherein:
the vehicle deceleration control section is configured to determine a vehicle-deceleration-control controlled variable based on the host vehicle's lateral deviation.

9. The LDP apparatus as claimed in claim 7, further comprising:
  a vehicle's driving state and traveling-path condition detector configured to detect at least a driving state of the host vehicle,
  wherein the control unit comprises a control allotted rate decision section configured to determine, based on the driving state, a control allotted rate of vehicle deceleration control to yaw moment control, and the vehicle deceleration control and the yaw moment control are executed based on the control allotted rate.

10. The LDP apparatus as claimed in claim 9, wherein:
the vehicle's driving state and traveling-path condition detector is configured to detect at least one of a host vehicle speed, a yaw rate resulting from a yaw moment acting on the host vehicle, a lateral acceleration exerted on the host vehicle, a yaw angle with respect to a sense of a driving lane of the host vehicle, and a curvature of the host vehicle's driving lane.

11. The LDP apparatus as claimed in claim 7, wherein:
the control unit further comprises:
  a lane-marker unrecognizable state detection section configured to determine that determines whether the host vehicle is in a lane-marker unrecognizable state where the lane marking line cannot be detected by the lane marker detector or in a lane-marker recognizable state where the lane marking line can be detected by the lane marker detector,
  wherein the vehicle deceleration control section is configured to fix a vehicle-deceleration-control controlled variable to a preset constant value when the lane-marker unrecognizable state detection section determines that the host vehicle is in the lane-marker unrecognizable state and additionally the road-surface irregularities detector determines that the host vehicle is in the state where the host vehicle is traveling on the road-surface irregularities.

12. An automotive lane deviation prevention (LDP) apparatus, comprising:
  a road-surface irregularities detector that detects whether a host vehicle is in a state where the host vehicle is traveling on road-surface irregularities formed on or close to a lane marking line;
  an actuator configured to decelerate the host vehicle;
  a control unit configured to be electronically connected to the road-surface irregularities detector and the actuator for LDP control purposes;
  the control unit comprising:
    a vehicle deceleration control section that executes vehicle deceleration control to actively decelerate the host vehicle when the host vehicle is in the state where the host vehicle is traveling on the road-surface irregularities;
    a picture image pick-up device that picks up a picture image in front of the host vehicle; and
    a lane marker detector that detects a lane marking line on a driving lane of the host vehicle, based on the picture image picked up by the picture image pick-up device,
  wherein the control unit further comprises:

a lane-deviation tendency detection section that determines, based on a host vehicle's lateral deviation estimated based on the lane marking line, whether the host vehicle is in a state where there is an increased tendency for the host vehicle to deviate from the driving lane or in a state where there is a less tendency for the host vehicle to deviate from the driving lane;

an LDP control section that executes yaw moment control by which the host vehicle's lane deviation tendency is avoided, when the host vehicle is in the state where there is an increased tendency for the host vehicle to deviate from the driving lane;

a lane-marker unrecognizable state detection section that determines whether the host vehicle is in a lane-marker unrecognizable state where the lane marking line cannot be detected by the picture image pick-up device or in a lane-marker recognizable state where the lane marking line can be detected by the picture image pick-up device; and a virtual-deviation-estimate based lane-deviation possibility estimation section that estimates, based on a virtual deviation estimate estimated based on historical data concerning a vehicle's driving state and a traveling-path condition of the host vehicle, all obtained just before a transition from the lane-marker recognizable state to the lane-marker unrecognizable state, whether the host vehicle is in a state where there is a high possibility for the host vehicle to deviate from the driving lane or in a state where there is a low possibility for the host vehicle to deviate from the driving lane, wherein the vehicle deceleration control section fixes a vehicle-deceleration-control controlled variable to a preset constant value, when the virtual-deviation-estimate based lane-deviation possibility estimation section determines that the host vehicle is in the state where there is a high possibility for the host vehicle to deviate from the driving lane in the lane-marker unrecognizable state and additionally the road-surface irregularities detector determines that the host vehicle is in the state where the host vehicle is traveling on the road-surface irregularities.

13. The LDP apparatus as claimed in claim 9, wherein:
the vehicle's driving state and traveling-path condition detector is configured to detect a host vehicle speed, a yaw angle with respect to a sense of a driving lane of the host vehicle, a lateral displacement of the host vehicle from a central axis of the driving lane, and a curvature of the host vehicle's driving lane;

the lane-deviation tendency detection section is configured to estimate a future lateral-displacement estimate based on the host vehicle speed, the yaw angle, the lateral displacement, and the curvature; and the lane-deviation tendency detection section is configured to determine that the host vehicle is in the state where there is an increased tendency for the host vehicle to deviate from the driving lane, when an absolute value of the future lateral-displacement estimate is greater than or equal to a predetermined lateral-displacement criterion.

14. The LDP apparatus as claimed in claim 7, further comprising:
a braking/driving force control device configured to control braking/driving forces of road wheels of the host vehicle, wherein the LDP control section comprises a braking/driving force controlled variable calculation section configured to calculate a braking/driving force controlled variable of each of the road wheels so that a yaw moment is produced in a direction in which the host vehicle's lane-deviation tendency is avoided, when the lane-deviation tendency detection section determines that the host vehicle is in the state where there is an increased tendency for the host vehicle to deviate from the driving lane; and the braking/driving force control device is configured to control the braking/driving forced of the road wheels, responsively to the braking/driving force controlled variables calculated.

15. The LDP apparatus claimed is claim 14, wherein:
the braking/driving force control device comprises a hydraulic modulator capable of controlling the braking forces of the road wheels, independently of a driver's break-pedal depression.

16. The LDP apparatus as claimed in claim 14, wherein:
the breaking/driving force controlled variable calculation section is configured to calculate the breaking/driving force controlled variables of the respective road wheels, based on a desired yaw moment calculated based on a difference between a future lateral-displacement estimate and a predetermined lateral-displacement criterion.

17. The LDP apparatus as claimed in claim 7, further comprising:
a steering control device configured to control a steering torque applied to a steering system of the host vehicle independently of a driver's steering action, wherein the LDP control section comprises a steering torque controlled variable calculation section configured to calculate a steering torque controlled variable of the steering system so that a yaw moment is produced in a direction in which the host vehicle's lane-deviation tendency is avoided, when the lane-deviation tendency detection section determines that the host vehicles is in the state where is an increased tendency for the host vehicle to deviate from the driving lane; and wherein the steering control device is configured to control the steering torque applied to the steering system, responsively to the steering torque controlled variable calculated.

18. An automotive lane deviation prevention (LDP) apparatus comprising:
road-surface irregularities detection means for detecting whether a host vehicle is in a state where the host vehicle is traveling on road-surface irregularities formed on or close to a lane marking line and arranged along the lane marking line;

picture image pick-up means for picking up a picture image in front of the host vehicle;

lane marker detection means for detecting a lane marking line of a driving lane of the host vehicle, based on the picture image picked up by the picture image pick-up means;

an actuator configured to decelerate the host vehicle; and a control unit configured to be electronically connected to the road-surface irregularities detection means, the lane marker detection means, and the actuator for LDP control purposes;

the control unit comprising:
LDP control means for executing, based on the detected lane marking line, yaw moment control by which a host vehicle's lane deviation tendency is avoided, when the lane marking line can be detected by the lane marker detection means; and vehicle deceleration control means for executing vehicle deceleration control to actively decelerate the host vehicle, when all following conditions occur:
(1) when the host vehicle is traveling on the road-surface irregularities formed on or close to the lane marking line and arranged along the lane marking line; and
(2) while the lane marking line cannot be detected by the lane marker detection means.

19. A method of preventing lane deviation of a host vehicle employing braking force actuators that adjust braking forces applied to respective road wheels, the method comprising:
(a) detecting whether a host vehicle is in a state where the host vehicle is traveling on road-surface irregularities formed on or close to a lane marking line and arranged along the lane marking line;
(b) picking up a picture image in front of the host vehicle by a picture image pick-up device;
(c) detecting a lane marking line of a driving lane of the host vehicle, based on the picture image picked up;
(d) executing, based on the detected lane marking line, yaw moment control by which a host vehicle's lane deviation tendency is avoided, in a lane-marker recognizable state where the lane marking line can be detected in the detecting step (a); and
(e) executing vehicle deceleration control to actively decelerate the host vehicle, when all following conditions occur:
(1) when the host vehicle is traveling on the road-surface irregularities formed on or close to the lane marking line and arranged along the lane marking line; and
(2) while the lane marking line cannot be detected in the detecting step (a).

20. The method as claimed in claim 19, further comprising:
(f) executing the yaw moment control actively exerting a yaw moment on the host vehicle simultaneously with active vehicle deceleration control when the host vehicle is in the state where the host vehicle is traveling on the road-surface irregularities in a lane-marker unrecognizable state where the lane marking line cannot be detected in the detecting step (a).

21. The method as claimed in claim 20, further comprising:
(g) fixing a desired deceleration rate for the active vehicle deceleration control to a preset constant value when the host vehicle is in the state where the host vehicle is traveling on the road-surface irregularities in the lane-marker unrecognizable state.

* * * * *